(12) United States Patent
Crawford

(10) Patent No.: US 8,528,186 B2
(45) Date of Patent: Sep. 10, 2013

(54) METHOD AND APPARATUS FOR SECURING A CONDUIT TO A STRUCTURE

(75) Inventor: Alexander Charles Crawford, Fife (GB)

(73) Assignee: Deep Tek IP Limited, Fife (GB)

( * ) Notice: Subject to any disclaimer, the term of this patent is extended or adjusted under 35 U.S.C. 154(b) by 1061 days.

(21) Appl. No.: 12/448,928

(22) PCT Filed: Jan. 28, 2008

(86) PCT No.: PCT/GB2008/000273
§ 371 (c)(1),
(2), (4) Date: Jul. 14, 2009

(87) PCT Pub. No.: WO2008/090363
PCT Pub. Date: Jul. 31, 2008

(65) Prior Publication Data
US 2010/0032939 A1 Feb. 11, 2010

(30) Foreign Application Priority Data

Jan. 27, 2007 (GB) .................... 0701600.9

(51) Int. Cl.
*B21D 39/00* (2006.01)
*B23P 11/00* (2006.01)

(52) U.S. Cl.
USPC ............ 29/512; 29/523; 29/432; 29/243.518; 114/50; 114/221 A; 141/312; 403/277

(58) Field of Classification Search
USPC .......... 29/512, 522.1, 523, 243.518, 243.519, 29/507, 432; 114/50, 44, 221 A; 141/312, 141/329, 383; 403/242, 277, 297
See application file for complete search history.

(56) References Cited

U.S. PATENT DOCUMENTS

| | | | | | |
|---|---|---|---|---|---|
| 998,352 | A | * | 7/1911 | Kublin | 141/300 |
| 2,146,461 | A | * | 2/1939 | Bettington | 29/512 |
| 2,410,476 | A | * | 11/1946 | Appleton et al. | 72/125 |
| 3,380,420 | A | * | 4/1968 | Divine | 114/50 |
| 3,822,660 | A | * | 7/1974 | Throner, Jr. | 114/50 |
| 3,906,776 | A | * | 9/1975 | Humphreys et al. | 29/798 |
| 4,150,467 | A | * | 4/1979 | Helgesson et al. | 29/26 B |
| 4,284,110 | A | * | 8/1981 | Divelbiss et al. | 141/98 |
| 4,821,665 | A | * | 4/1989 | Matthias et al. | 114/222 |
| 5,775,390 | A | * | 7/1998 | Mohn | 141/329 |
| 5,795,103 | A | * | 8/1998 | Gaerlan | 405/188 |
| 7,377,226 | B2 | * | 5/2008 | Choi | 114/312 |

FOREIGN PATENT DOCUMENTS

| | | |
|---|---|---|
| EP | 1 568 600 | 8/2005 |
| GB | 2 217 801 | 11/1989 |

* cited by examiner

*Primary Examiner* — David Bryant
*Assistant Examiner* — Christopher Koehler
(74) *Attorney, Agent, or Firm* — Drinker Biddle & Reath LLP

(57) ABSTRACT

A method and apparatus for securing a conduit to relatively inaccessible structures, for example, oil tanks on submerged ships. The method involves providing a conduit with a neck, temporarily securing the conduit to the surface, for example by means of magnets, etc, drilling a hole through the structure and passing the neck of the conduit through the hole in the structure, and passing an expander device through the neck of the conduit through the hole in the structure to widen a portion of the internal passage of the conduit in the region of the neck.

26 Claims, 27 Drawing Sheets

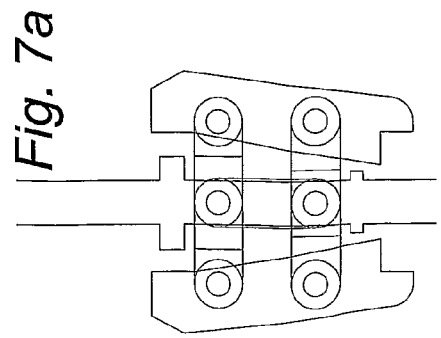
Fig. 7a
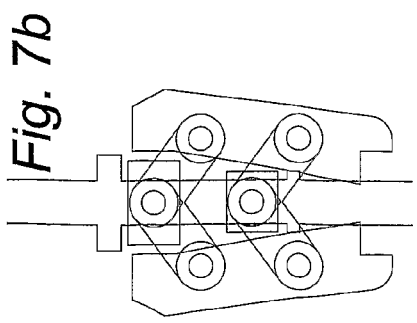
Fig. 7b
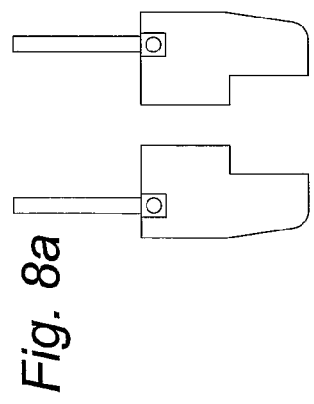
Fig. 8a
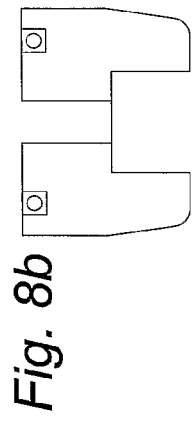
Fig. 8b
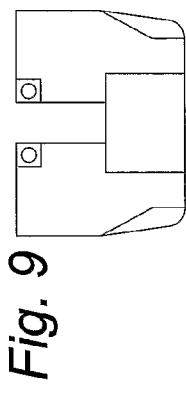
Fig. 9
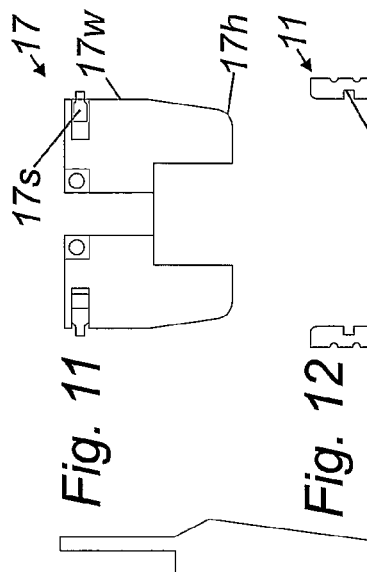
Fig. 10
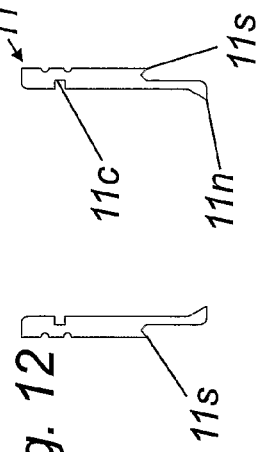
Fig. 11
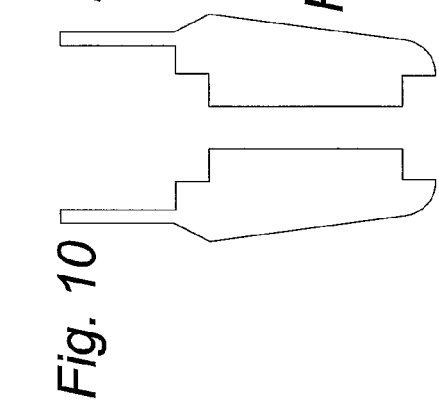
Fig. 12
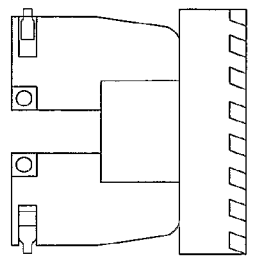
Fig. 13
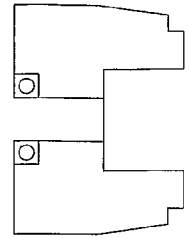
Fig. 14
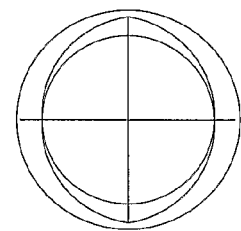

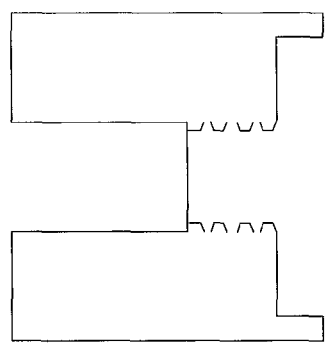
Fig. 29
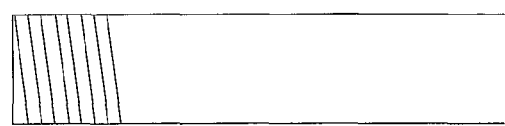
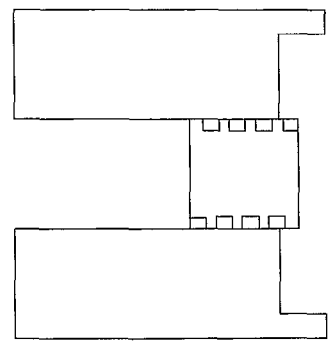
Fig. 28
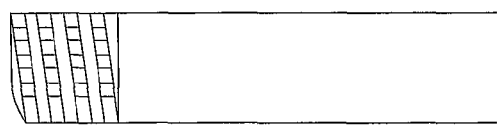

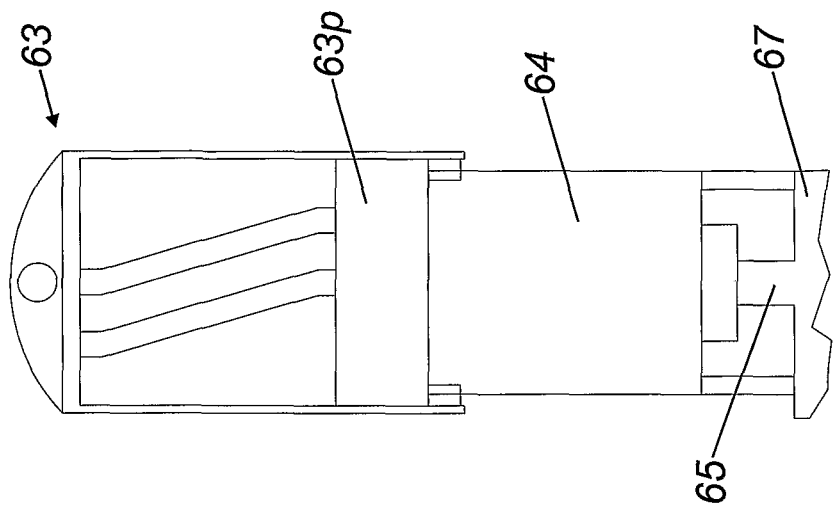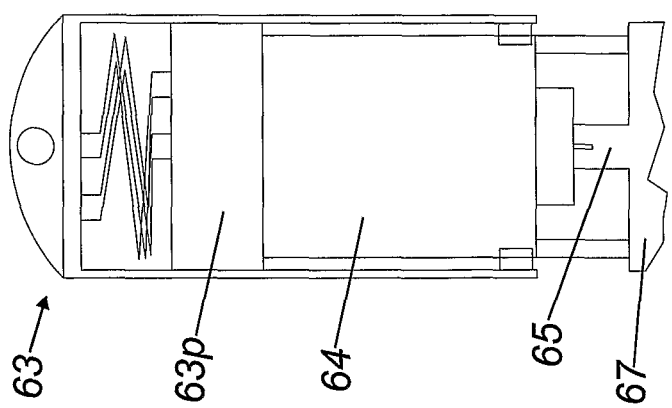
Fig. 33

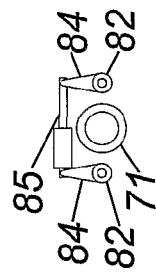
Fig. 40
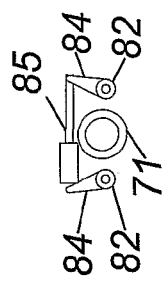
Fig. 41
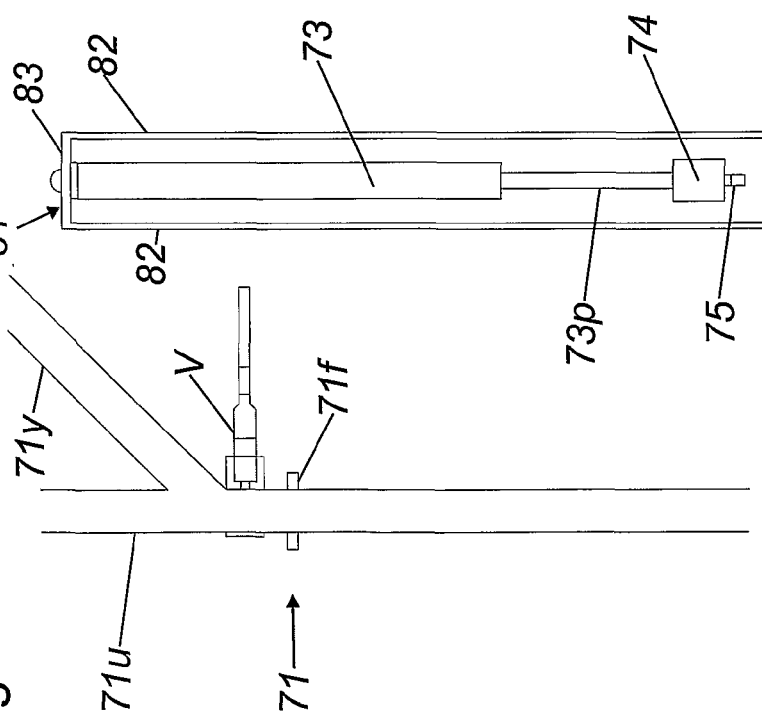
Fig. 37
Fig. 35
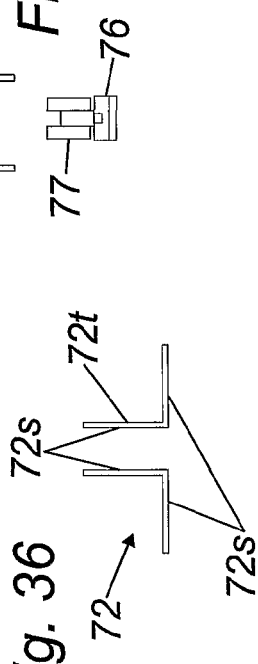
Fig. 38
Fig. 36

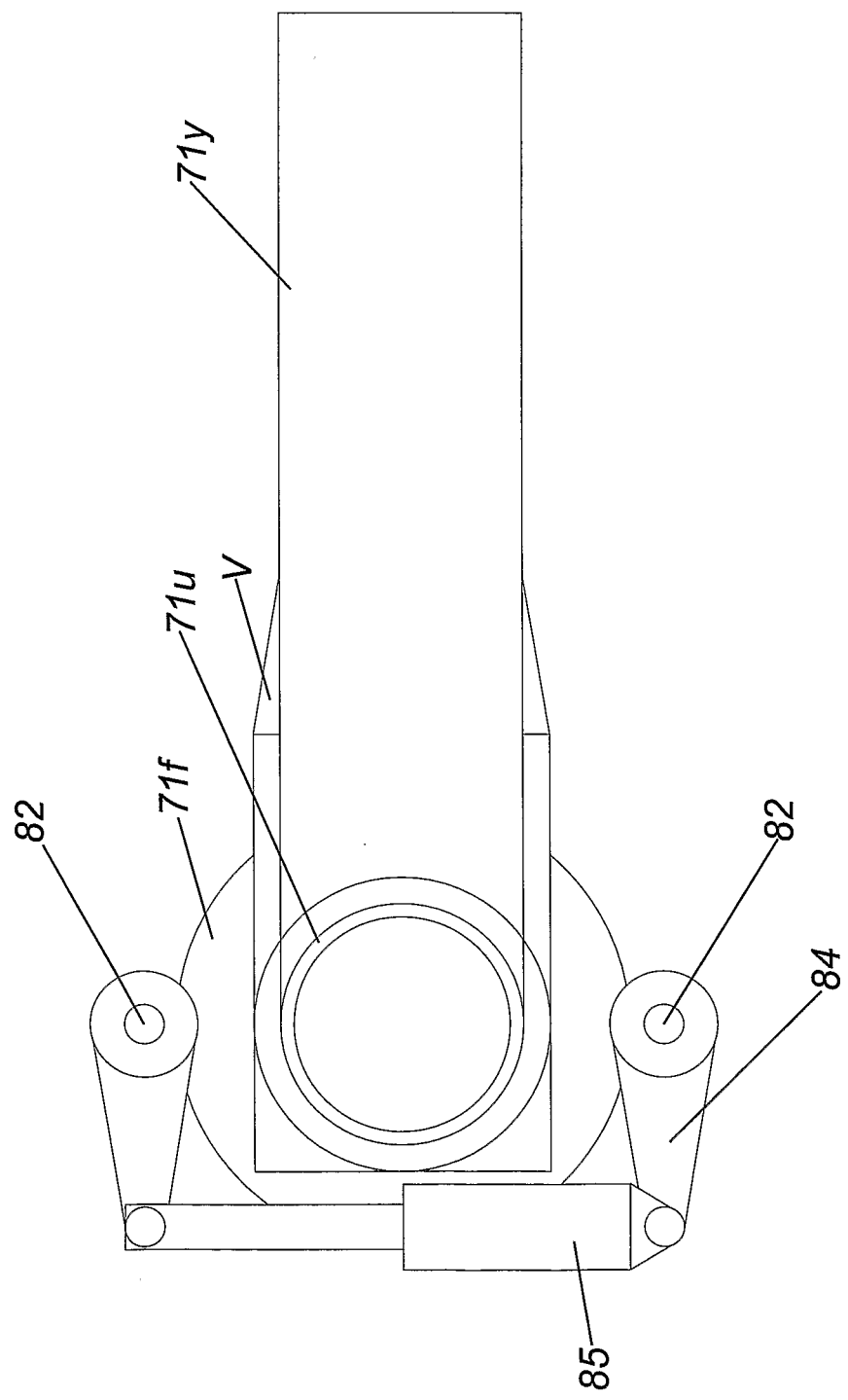

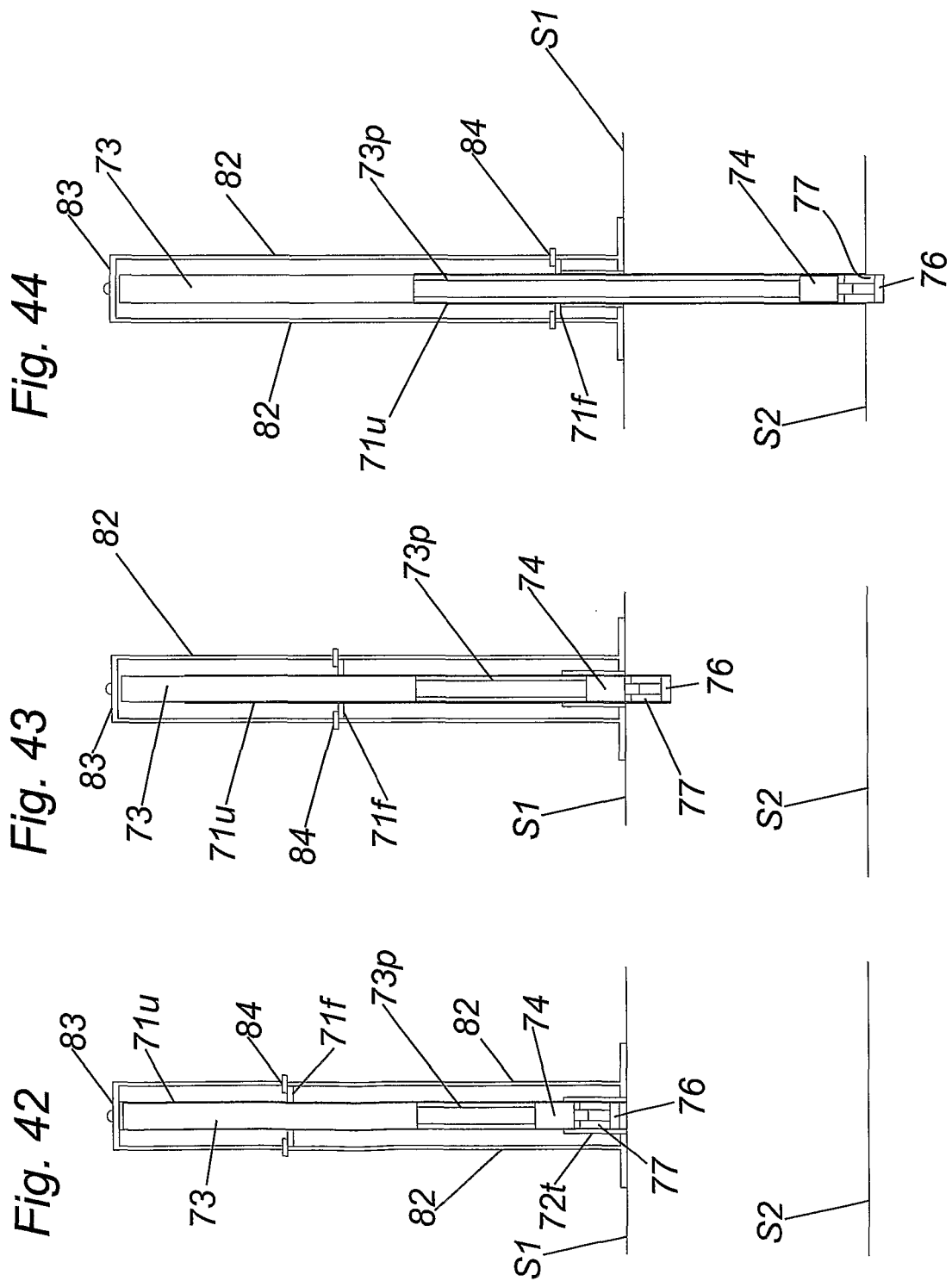

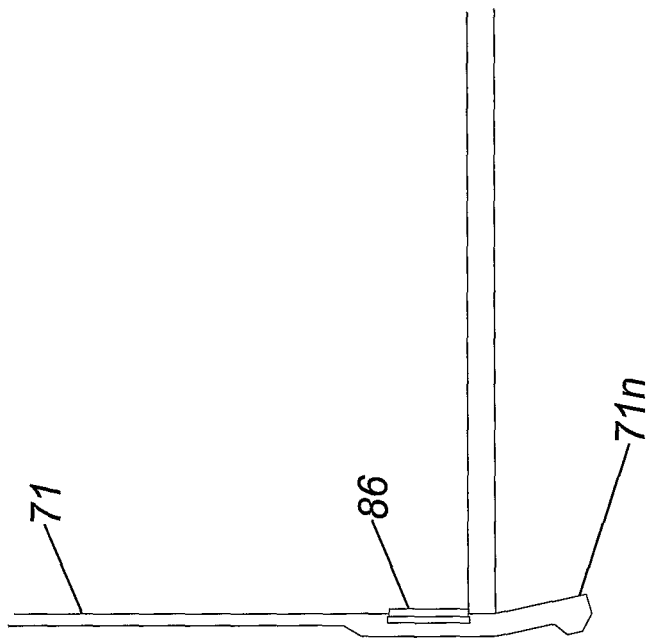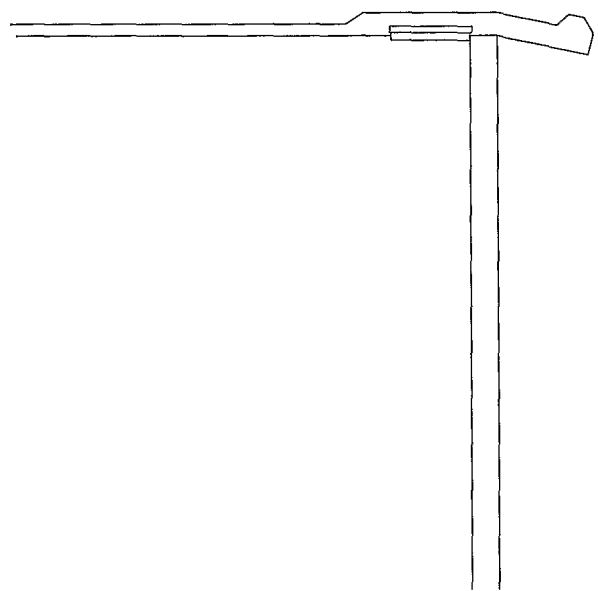
Fig. 48

METHOD AND APPARATUS FOR SECURING A CONDUIT TO A STRUCTURE

This Application is the U.S. National Phase Application of PCT International Application No PCT/GB2008/000273 filed Jan. 28, 2009

This invention relates to a method and apparatus for securing a conduit to a structure. The structure typically contains fluids to be removed through the conduit. Some embodiments may be useful for structures into which fluids are to be injected through the conduit. Embodiments of the invention are particularly useful for attaching conduits such as pipes to structures that are relatively inaccessible, for example, tanks and other structures that are submerged in water and only allow access to one face of the tank. Some embodiments are useful for attaching pipes for the removal of oil and other environmentally damaging fluids from submerged ships.

DESCRIPTION OF THE RELATED ART

Many submerged structures such as sunken ships etc contain large amounts of oil or other fluids that would be environmentally damaging to release into the surrounding environment in an uncontrolled manner. In order to prevent uncontrolled release of the fluids from the structure, the oil or other fluid is typically removed from the structure in a controlled manner, and conduits such as pipes are traditionally secured to tanks in sunken ships for the purpose of emptying the tank of the oil contained therein.

Currently, flanged pipes are secured to tanks by welding if possible, otherwise they can be secured by fasteners such as bolts or rivets. In some cases when both sides of the tank are accessible, the pipe can be swaged into a previously bored hole using a pipe swaging tool.

The traditional method for liquid or gas removal (or supply) on a submerged wreck or structure has been to use divers or remotely operated vehicles (ROVs) to drill and tap holes in the structure in order to fit a flanged pipe, by the use of bolts passing through the flanges. The flanges are often held against the structure by magnetic drill stands as they are drilled and secured to the structure. The flanged pipe is normally prefitted with a valve and the final hole in the structures is drilled down through the open valve within the bore of the attached pipe in order to contain the oil within the pipe when the drill is removed.

The current process can be risky if the liquid or gas in the tank is under pressure, or is flammable or toxic, and it is always time consuming and difficult, and therefore expensive in terms of diver time and level of skill needed. The time and expense is compounded by the fact that oil frequently spills from the tank or machinery spaces of most wrecks and some of it remains trapped within other parts of the ships structure. The oil must therefore be removed from various different parts of the wreck, which typically requires a large number of pipes to be attached in different locations for the controlled removal of all of the oil.

BRIEF SUMMARY OF THE INVENTION

According to the present invention there is provided a method for attaching a conduit to a structure, the method comprising the steps of
  providing a conduit with an internal passage having a neck;
  forming a hole through a face of the structure to enable passage of a portion of the conduit through the hole;
  passing a portion of the conduit through the hole in the structure, whereby the neck of the conduit passes through the hole in the structure;
  providing a expander device adapted to be a restricted fit in the neck; and
  driving the expander device through a portion of the conduit, whereby the expander device widens a portion of the internal passage of the conduit in the region of the neck.

Typically the structure is planar and has a first face and an opposite second face. For example, the structure can comprise a tank having an outer (first) face, and an inner (second) face. In certain embodiments, a portion of the conduit passes through a hole in the outer (first) face of the structure until the neck passes through the hole entirely, and extends beyond the second (inner) face of the structure at the opposite end of the hole. The conduit typically has a shoulder or flange or some other stop mechanism on the outer surface of the conduit in order to restrain the movement of the conduit too far into the hole, so that when the shoulder engages the outer face of the structure and prevents further axial movement of the conduit into the hole, the neck only extends a short distance from the opposite inner face of the structure. The neck can have a restriction in the inner diameter in some embodiments, but in other embodiments, the internal diameter of the neck can be flush with the inner diameter of the conduit.

The invention also provides apparatus for transfer of fluids to or from a structure, the apparatus having
  a conduit having an internal passage with a neck;
  a perforating mechanism to form a hole in the structure to receive a portion of the conduit;
  an expander device adapted to be received within the internal passage of the conduit, and having at least one portion that has a larger dimension than the neck of the internal passage; and
  a driving mechanism adapted to drive the expander device through the internal passage of the conduit, and to expand the neck of the conduit.

Typically the neck is malleable so that it can be deformed by the passage of the expander device from a first configuration in which it allows passage of the neck through the hole before the expander device is passed through the internal passage, to a second configuration, in which it prevents or restricts passage of the neck through the hole, after expansion of the neck by the movement of the expander device through the internal passage. The neck is typically formed at the distal end of the conduit that is inserted into the hole in the structure.

In some embodiments the internal dimensions of the internal passage can vary along the length of the internal passage. For example, the neck can be in the form of a step or lip in the internal surface of the conduit, for example, an internal shoulder, protrusion or ring extending radially into the internal passage, typically within the bore of the internal passage and spaced some distance from the end of the passage. The step or lip can be continuous around the whole circumference of the inner surface of the neck, or it can be formed in discrete portions that are discontinuous. In some embodiments, the initial internal dimensions of the internal passage can be substantially constant along its length, and the neck can be located at one end of the passage, and the external surface can be deformed into a funnel shape by the movement of the expander device through the passage. It is sufficient for the external diameter to be deformed into an asymmetric shape to retain the neck in the hole, as the expander device will typically expand the internal passage to a uniform internal dimension. The lip can be formed from a step that is machined, cut or moulded into the inner surface of the bore of the conduit. In some embodiments the lip can be formed separately and subsequently attached, for example by welding or gluing a protrusion such as an annular or semi-annular ring to the inner surface. In some embodiments of the invention, the lip can comprise a formation of solder or weld residue formed on the inner surface of the bore of the conduit.

Typically the drive mechanism is adapted to drive the conduit through the hole in the structure. The apparatus may also include an attachment mechanism optionally comprising a clamping mechanism to temporarily connect the conduit to the structure before the expander device is driven through the conduit.

The conduit can be cylindrical, with an inner surface that is arcuate in cross section. In some embodiments, the conduit can be square, and the inner surface of the conduit can have other shapes of cross section, such as rectangular cross sections.

The stop mechanism typically comprises a shoulder or a flange that extends radially from the conduit perpendicular to the axis of the conduit. Some embodiments have a clamping mechanism to temporarily restrain the conduit in place at the structure while it is being attached, and can typically comprise magnetic devices adapted to connect the flange to the structure prior to formation of the hole, typically to the outer face of the structure. In some embodiments the stop means can include a resilient ring such as a collet or spring ring.

The perforating mechanism can be a drill with a cutting bit, optionally mounted on a drill stem. The cutting bit can be advanced by a bit driving mechanism, such as a hydraulic cylinder and piston arrangement. The same hydraulic cylinder and piston arrangement can optionally be used to drive the conduit into contact with the structure. The same driving mechanism can optionally be used to drive the movement of the expander device, although that can be driven by other mechanisms.

The expander device can be tapered, with one portion that is wider than the neck, and one portion that is narrower than the neck. The expander device can incorporate moving parts, for example it can itself be adapted to expand during, before or after passage of the device through the passage. In some embodiments, the expander device can be solid with no moving part. The expander device is typically conical or frusto-conical. The expander device can be apertured to allow passage of the drill stem, and can optionally incorporate bearings to control the torque that is applied to the expander device. The expander device can be mounted within an upper portion of the conduit, and above the neck, or below it. The expander device can be adapted to pass all the way through the neck (or the pipe) or only through a section of the neck or the pipe.

The apparatus can be mounted in a guide assembly, housing the conduit with the neck, and optionally having a flange to facilitate temporary connection to the structure before the expander device is driven through the conduit.

The fluid can comprise any flowable substance, and embodiments of the invention are particularly suited for use with liquids such as oil, water and chemicals; solids such as powders; or gasses. In some embodiments, the fluids can comprise micro-organisms.

Embodiments of the invention typically allow securing of the conduit in place from only one side of the tank. The complete operation of attaching a pipe may be undertaken quickly and in one step without withdrawing taps or drills to fasten bolts in the holes as that may allow fluid or gas to escape. This method may be used more easily in hazardous areas and ultra deep water with less risk to operating personnel.

Embodiments of the invention typically require fewer operator skills because the driving mechanisms can be set up on the surface prior to the system being attached to the structure. Embodiments can be quickly clamped (temporarily or permanently) to the structure (e.g. using magnets) and the pipe can be attached from one side of the structure within minutes. Embodiments of the equipment can be easily transported and can be operated on different vessels ranging from small fishing boats to large ships.

The guide assembly containing the conduit is typically lowered onto the tank top, side or any part of the tank or structure requiring a pipe to be attached. It is optionally clamped temporarily in position by magnets, weights, brackets or fixings such as self tapping screws or bolts typically acting between a flange on the guide assembly and the tank. Once the guide assembly is attached to the tank the drill is actuated and the tank is cut by the drill bit. For this purpose the drill bit can be mounted on one end of the guide assembly, below the remaining components, and typically on the end of a drill stem that can optionally extend through apertures (optionally with bearings) in the components placed above it in the guide assembly. The conduit with the neck is then typically pushed through the drilled hole until it is held from further axial movement into the hole by a flange or other stop member located on the outer surface of the conduit. An expander device is then forced through the conduit, where it comes up against the neck that typically comprises a stepped portion that protrudes radially inwards from the inside surface of the pipe. As the expander device is forced further through the pipe the tapered end of the expander device pushing past the stepped portion of the neck within the pipe causes the pipe to expand within the hole and lock itself in the hole. Typically the stepped portion is passed all the way through the hole to emerge from the other side of the tank, but embodiments of the invention can still function if the portion of the neck that is expanded is still within the hole when the flange of the conduit is flush against the outer surface of the tank.

The expander device is typically forced through the conduit past the neck until it drops from the distal end of the pipe along with the drill bit and the drill stem into the structure. The drill motor, the hydraulic driving mechanism and optionally the guide assembly can then typically be recovered leaving the pipe attached to the structure.

The clamping mechanism, usually made up of magnets, advantageously has sufficient force to resist the rotational force of the drill and to have enough force to react against the force of the pipe being pushed into the hole. As long as the force mechanism is attached to both the pipe and the guide there is substantially no force pushing the pipe out of the hole when the mandrel is being forced in to swage the pipe.

In a further embodiment, the guide assembly is loaded with the required components but the conduit can have parallel and continuous internal walls with no stepped portion, and the neck is formed at the distal end of the pipe that is to be inserted into the hole. The expander device is assembled below the neck at the distal end of the internal passage of the conduit. Once the different components are in position the guide assembly is lowered onto the tank top, side or any part of the tank or structure requiring a pipe to be attached. It is clamped in position and the hole is drilled for the conduit as described above. The pipe is then pushed through the hole with the cutter and expander device going before it, until further movement of the pipe is prevented by its external flange (different stop members could be used as well or instead without extending all the way around the circumference of the pipe). The tapered expander device that is attached to a shaft and lies beyond the hole cutter is then forced (e.g. pulled)

back towards the flange until the tapered outer surface of the expander device engages the inner surface of the neck. As it is forced further into the neck of the pipe the tapered end of the expander device deforms the neck to push it radially outwards, which causes the pipe to expand and lock itself in the hole. The mandrel is forced back towards the cutter until they both drop through the structure leaving the hole clear. The drill, force mechanism and guide can be recovered leaving the pipe firmly attached to the structure. The internal surface of the neck can be plain, with parallel walls, or it can be stepped, with a rib, lip or other internal protrusion to engage the outer surface of the expander device. The internal protrusion can be continuous around the whole inner circumference of the pipe or it can be formed in discrete portions.

According to this modification, the clamping system, usually made up of magnets, only requires sufficient force to resist the rotational force of the drill, and to push the pipe through the hole as the force on the mandrel when it swages the pipe acts against the flange and thereby exerts no force pushing the guide off the structure.

In certain embodiments, the structure has a double skin, each with an outer and an inner surface, and the oil to be recovered is located within the inner skin, with a void between the spaced apart inner and outer skins. In such cases, it is advantageous if the conduit is passed through the outer and inner skins of the structure before the neck is expanded, so that the neck is expanded when a portion of the neck is located in or beyond the inner skin of the structure. In such embodiments, the guide plate is typically stably connected to the outer skin (typically on the outer surface of the outer skin) and the neck is inserted through holes in the outer and inner skin, before the expander device is driven through the neck.

In some embodiments the drive mechanism can be secured to the structure, and typically this is done by securing the guide plate to the structure and securing the drive mechanism to the guide plate, thereby transferring reaction forces applied to the drive mechanism during driving of the expander device back to the structure through the securing connections. Typically the drive mechanism can be secured in this way by a locking mechanism, which can be welded or swaged to the guide plate and/or the structure. Typically the locking mechanism has locking devices to engage and release the conduit. Typically the locking mechanisms can comprise elongate rods extending parallel to the conduit, and connected to the conduit through lever arms that engage and disengage the conduit, typically interacting with a flange on the conduit.

Optionally the conduit can be a pipe that is adapted to convey fluids from the structure to a recovery vessel outside the structure. In some embodiments, the conduit can comprise a shorter sleeve that is adapted to physically connect the structure to another conduit for conveying the fluids to the recovery vessel. The sleeve can optionally have fasteners and/or seals to mechanically connect and seal it to the other conduit.

Embodiments of the invention could also be used for securing a plate to a structure. In certain embodiments the structure could optionally be lifted by the pipe.

BRIEF DESCRIPTION OF THE SEVERAL VIEWS OF THE DRAWINGS

Embodiments of the invention will now be described, by way of example, with reference to the accompanying drawings, in which.

FIG. 7 shows a first expander device for use in the FIG. 1 apparatus;

FIG. 8 shows a second expander device;

FIG. 9 shows a third expander device;

FIG. 10 shows a fourth expander device;

FIG. 11 shows a fifth expander device;

FIG. 12 shows an attachment sleeve for use with a second embodiment of the invention;

FIG. 13 shows a further view of the fifth expander device;

FIG. 14 shows a sixth expander device;

FIGS. 28 and 29 show alternative connections between the drill stem and the motor of any of the apparatus described herein;

FIG. 33 shows a side view of hydraulic cylinders used in various methods shown in the drawings;

FIG. 35 is a side sectional view of a conduit for the seventh embodiment;

FIG. 36 is a side sectional view of a guide plate for the seventh embodiment;

FIG. 37 is a front view of a hydraulic cylinder assembly for the seventh embodiment;

FIG. 38 is a side sectional view of a drift and drill bit assembly for the seventh embodiment;

FIG. 39 is a plan view of the seventh embodiment;

FIGS. 40 and 41 show plan views of a lever arm assembly of the seventh embodiment in locked and free configurations respectively;

FIGS. 42 to 46 show sequential front views of the seventh embodiment being used;

FIG. 48 shows a sectional view of the end of the conduit of the seventh embodiment following connection.

DETAILED DESCRIPTION OF THE INVENTION

Figure 1:
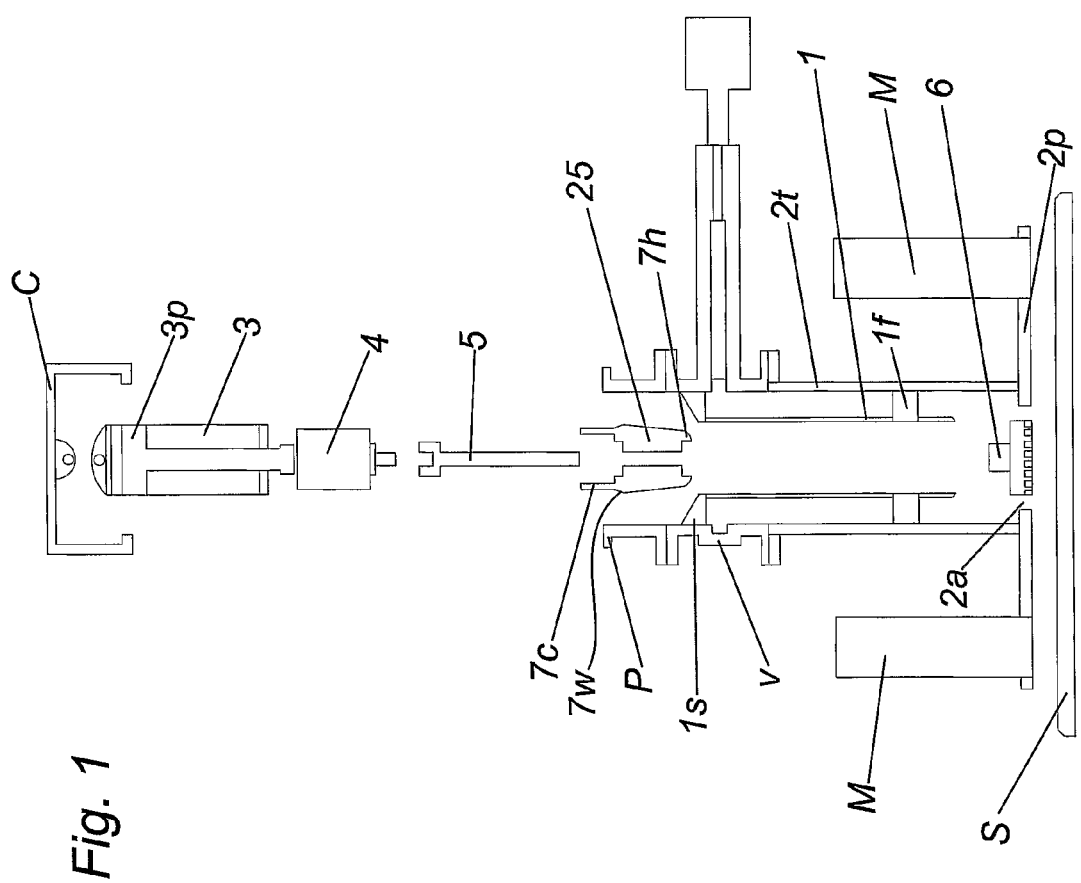
FIG. 1 shows an exploded view of a first embodiment of apparatus for securing a conduit to a structure.
Figure 5:
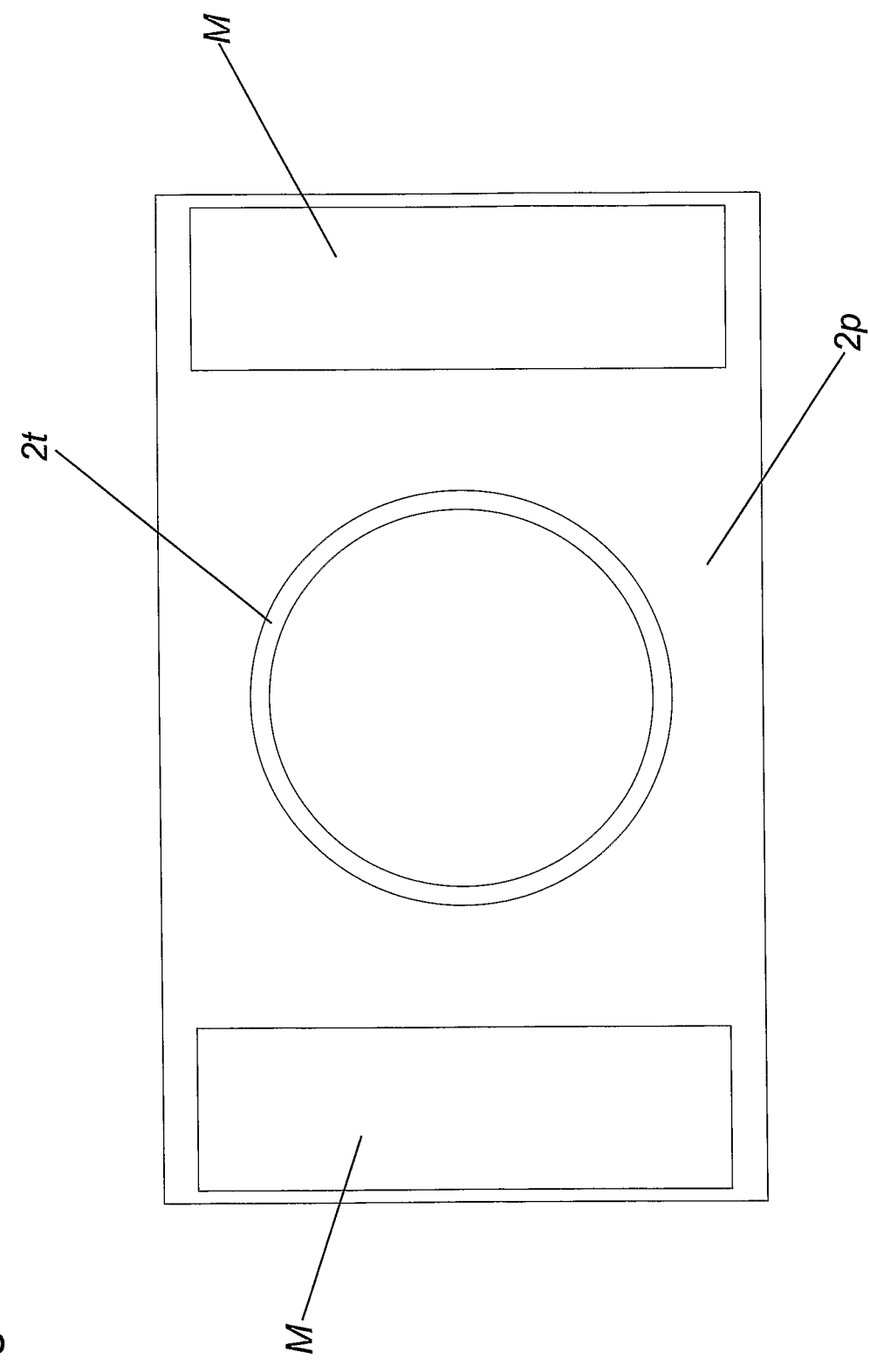
FIG. 5 shows a guide frame for the FIG. 1 apparatus.
Figure 6:
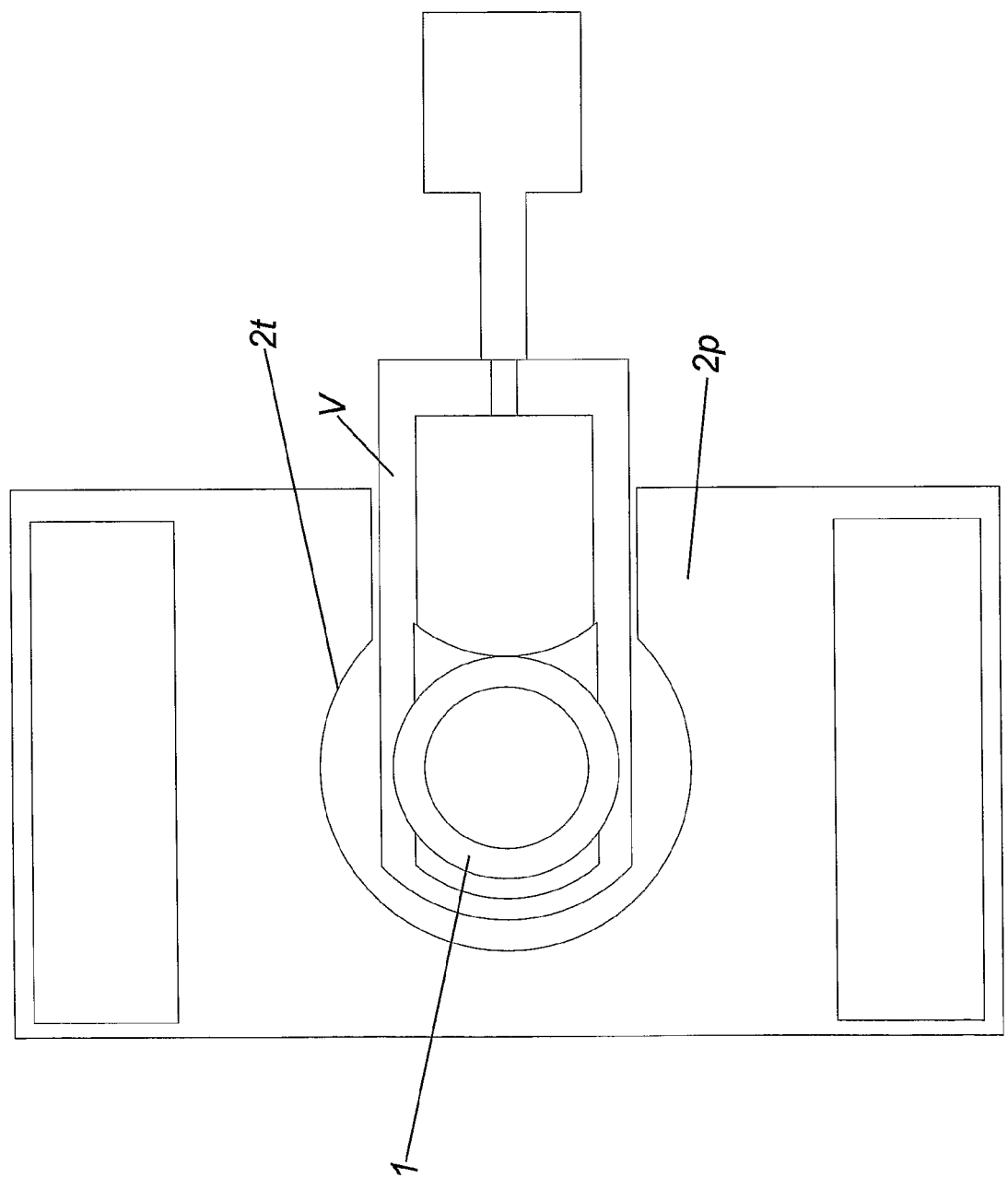
FIG. 6 shows the FIG. 5 guide frame with a cut out to clear a valve.

Referring now to the drawings, FIG. 1 shows a first embodiment for attaching a conduit to a structure S. In the FIG. 1 exploded view, the conduit comprises a cylindrical pipe 1 having an external flange 1f that is spaced from one distal end. As best shown in FIGS. 5 and 6, the apparatus for attaching the pipe 1 comprises a guide plate 2p that is flat and rectangular, and a guide tube 2t with a hollow bore that extends perpendicularly from the upper face of the guide plate 2p. The guide tube 2t is welded to the guide plate 2p, and is co-axial with and surrounds a central aperture 2a in the guide plate 2p which is slightly narrower than the bore of the guide tube 2t, so that a radially extending lip is formed between the aperture 2a and the lower face of the tube 2t. The bore of the guide tube 2t and the aperture 2a are coaxial.

The upper end of the guide tube 2t is flanged to accept a valve housing V carrying a valve that is adapted to close the bore of the valve housing V. The valve housing V is similarly flanged to support on its upper surface a spacer P. The bores of the spacer P, the valve housing V and the tube 2t are coaxial with one another, and with the aperture 2a, and all of these components have a circular cross section.

The plate 2p has rectangular apertures on each side of the aperture 2a, through which magnets M partially extend, and from which they emerge on the lower surface of the plate 2p to engage the surface S, which is typically metallic, and to which the magnets M can temporarily connect. The magnets M are typically switchable, and can be for example electromagnets, and magnetic drill stands can be used for this purpose. The guide plate 2p, guide tube 2t, valve housing V and spacer P together comprise a guide assembly for delivering and connecting a pipe 1 to the structure S.

The pipe 1 is located within the bore of the guide tube 2t, and extends beyond the guide tube 2t into the valve housing V when it is in its initial retracted position, before the pipe 1 is connected to the structure S. The pipe 1 has a smaller diameter than the bore of the guide tube 2t, and is typically spaced therefrom by means of flanges 1f, and optionally by means of a spacer 1s at its upper end. If desired, the flange 1f and spacer 1s can be sealed to the inner surface of the bore of the guide tube 2t, and optionally the valve housing V, by means of rings or other seals, although this is not necessary. The pipe 1 is axially slidable within the bore of the guide tube 2t and the valve housing V. The spacer P is open at each end and accepts on its upper end a cap in the form of a removable cap C that carries a hydraulic cylinder 3 with a piston 3p to which is connected a rotary motor 4 that rotates a drill stem 5. The cylinder 3 and the drill stem 5 extend through the bore of the spacer P, valve housing V and guide tube 2t, and the drill stem 5 is connected at its lower end to a rotary drill bit 6 that is suitable for cutting a circular hole through the structure S. As is shown in FIG. 1, the bit 6 fits within and is adapted to pass through the aperture 2a of the guide plate 2p. Before being connected to the drill bit 6, the drill stem 5 passes through an inner bore of an expander device in the form of a drift 7. The drift 7 has the same shape of external circumference as the pipe 1 (in this case they are circular) and at its widest point, it is selected to be a close fit with the inner diameter of the pipe 1. The widest point of the drift 7 is the apex 7w at its upper portion, and the drift 7 progressively narrows in its external diameter towards a head 7h at its lower end. At its upper end, the drift 7 has a cylindrical portion 7c that extends up from the widest point at the apex 7w of the drift 7. The cylindrical portion 7c in this case is an integral part of the drift, but it can optionally be a separate cylindrical spacer. On the inner bore of the drift 7 there are two recesses for receiving bearings in order to bear against the drill stem 5 within the inner bore of the drift 7, so that the rotation of the drill stem 5 during operation of the motor 4 is not transmitted to the drift 7.

Figure 2:
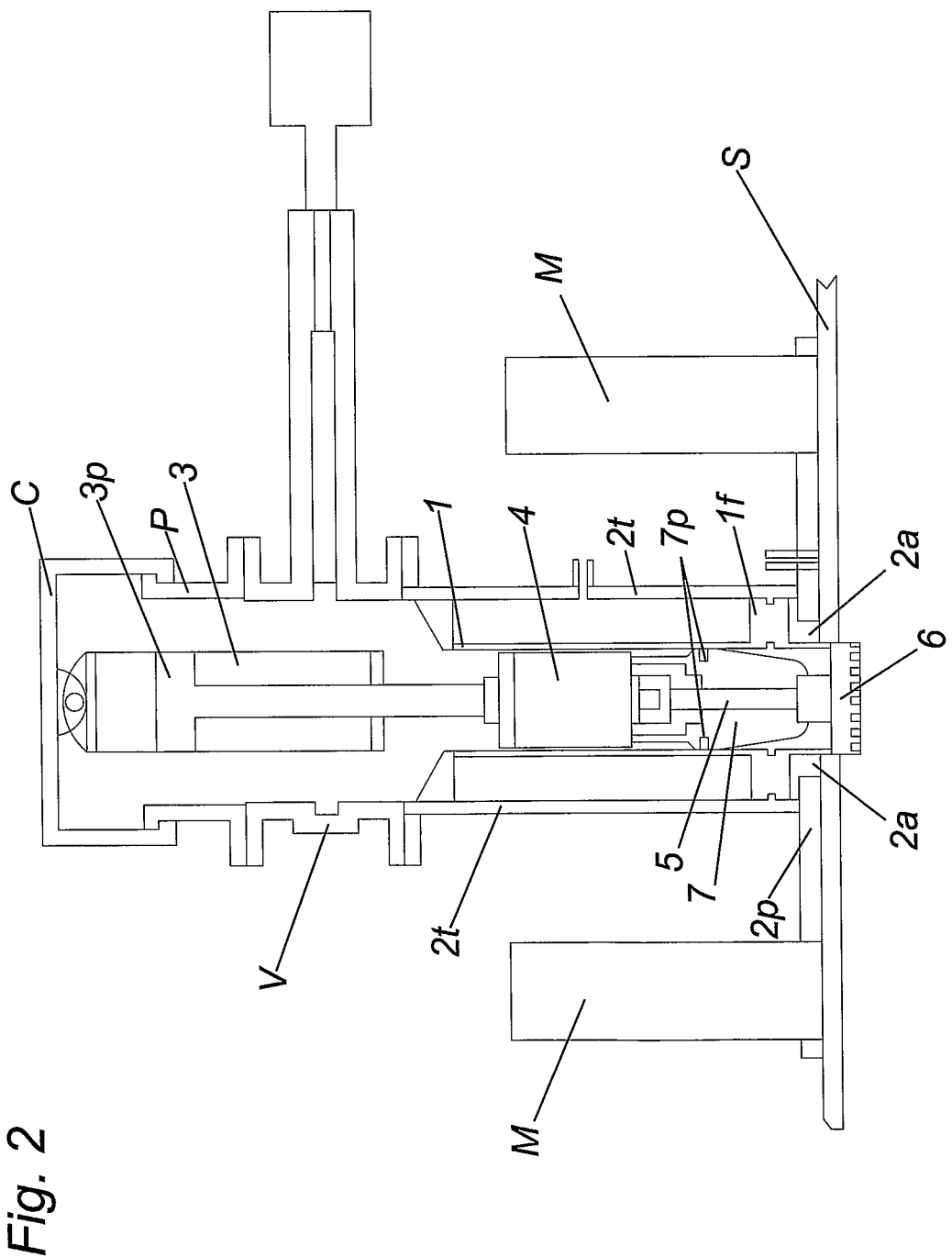
FIGS. 2-4 show sequential views of the FIG. 1 apparatus attaching a conduit to a structure.

The hydraulic cylinder 3 with the attached motor 4 and drill stem 5 are connected to the removable cap C, and then the drill stem 5 is offered to the inner bore of the drift 7, so that the drift 7 slides up the drill stem 5 until the upper edge of the cylindrical section 7c of the drift 7 abuts against the lower surface of the motor 4 as shown best in FIG. 2. At that point, the whole assembly of the drift 7, the drill stem 5, the motor 4, the hydraulic cylinder 3 and the removable cap C are offered into the bore of the spacer P, the valve housing V and the pipe 1, so that the drift passes down the inner bore of the pipe 1, as best shown in FIG. 2. Once the removable cap C has been attached to the upper flange of the spacer P, the lower end of the drill stem 5 will protrude from the lower end of the drift 7, and the drill bit 6 can then be attached to the lower end of the drill stem 5, beneath the drift 7, so that it is suspended above (or against) the plate 2p, and does not extend beyond the lower surface of the aperture 2a. At this initial assembly stage, before the structure S has been cut, the pipe 1 is still in the position shown in FIG. 1, and the drift 7 is freely slidable along the axis of the bore in the pipe 1.

When the pipe 1 is ready to be attached to the structure S, the entire assembly is lowered or otherwise guided onto the surface S, and the magnets M are actuated or allowed to attach in order to temporarily clamp the guide frame 2 onto the structure S. Other temporary attachment mechanisms can be used instead of magnets in certain cases, for example, suction devices or adhesive etc. With the drill bit 6 still spaced above the plane of the plate 2p and not extending out of the aperture 2a, the motor 4 is actuated in order to drive the rotation of the drill stem 5 and the drill bit 6. The bearings between the outer face of the drill stem 5 and the inner bore of the drift 7 prevent the transmission of torque from the rotating drill stem 5 onto the drift 7, which remains rotationally stationary, and a relatively tight fit within the bore of the pipe 1. Once the drill bit 6 is rotating at the required cutting speed, the piston 3p within the hydraulic cylinder 3 is extended to push the motor 4 down the pipe 1. Since the lower surface of the motor 4 abuts against the upper cylindrical portion 7c of the drift 7, the drift 7 is also pushed axially down the bore of the pipe 1 by the extension of the hydraulic cylinder 3. Naturally, the extension of the hydraulic cylinder 3 also drives the drill stem 5 and the drill bit 6 through the structure S ahead of the pipe 1 and the drift 7, thereby cutting an access hole to receive the pipe 1.

The cutting diameter of the drill bit 6 is chosen to closely match the external diameter of the pipe 1, so that the lower end of the pipe 1 is a snug fit within the hole that is drilled through the structure S, as best shown in FIG. 2. The downward movement of the drill bit 6 through the structure S continues until the hole is cut and eventually the flange 1f (which has a larger diameter than the hole that has been cut) bottoms out on the upper surface of the plate 2p. At this point (just after the stage shown in FIG. 2) further axial movement of the pipe 1 within the guide tube 2t is prevented. At this position with the flange 1f shouldered on the lip of the aperture 2a, the lower end of the pipe 1 extends all the way through the hole in the structure S that has just been drilled by the bit 6 so that it protrudes from the lower face of the structure S.

The flange 1f of the pipe 1 typically has a circlip located in a circumferential groove in the outer surface of the flange. The circlip is energised to expand against the inner surface of the guide tube 2t. As the pipe 1 moves down the bore of the guide tube 2t, and the flange 1f approaches the lip of the aperture 2a at the plate 5s, the circlip moves into axial alignment with a groove on the inner surface of the guide tube 2t, at the same time as the flange 1f bottoms out on the lip of the aperture 2a. The circlip is then free to expand between the groove on the outer surface of the flange and the groove on the inner surface of the guide tube 2t, so as to lock the flange and pipe 1 axially within the bore of the guide tube 2t, with the flange 1f bottomed out on the lip of the aperture 2a, and the lowermost end of the pipe 1 extending through the drilled aperture in the surface S.

Figure 3:
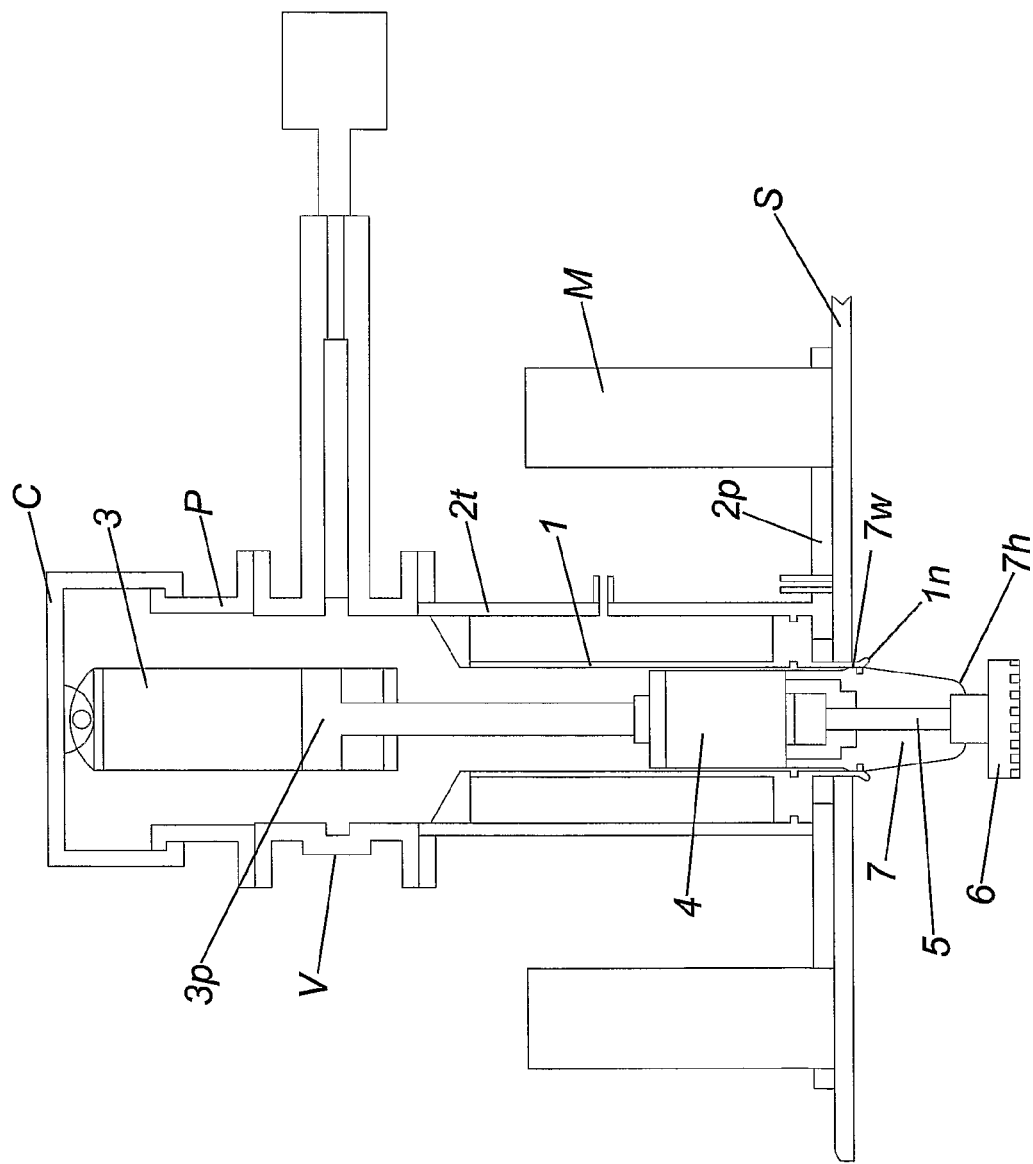

Once the flange 1f has engaged with the lip at the edge of the aperture 2a and the circlip has expanded, the continued movement of the piston 3p within the cylinder 3 continues to exert axial force on the drift 7 pushing it axially down the now stationary pipe 1. As the drift 7 moves axially down the pipe 1 it reaches an axial position at which shear pins 7p that are pressed inward against springs in radial recesses in the drift 7 become axially aligned with a circumferential slot in the inner surface of the pipe 1, at which point the shear pins 7p are extended radially outwards by the springs into the slot in order to lock the drift 7 to the pipe 1. At that point, the configuration of the apparatus is between the stages FIGS. 2 and 3, with the drill bit 6 extending from the aperture 2a, and the drift 7 only just starting to protrude from the lower end of the pipe 1.

As the hydraulic cylinder 3 continues to push the piston 3p downwards, the shear pins 7p connecting the drift 7 to the pipe 1 eventually shear under the force applied by the hydraulic cylinder 3, freeing the drift 7 to move axially within the bore of the pipe 1. Further downward movement of the drift 7 pushes the head 7h of the drift with its narrower diameter out of the end of the pipe 1, which is now extending below the lower surface of the structure S.

Figure 4:
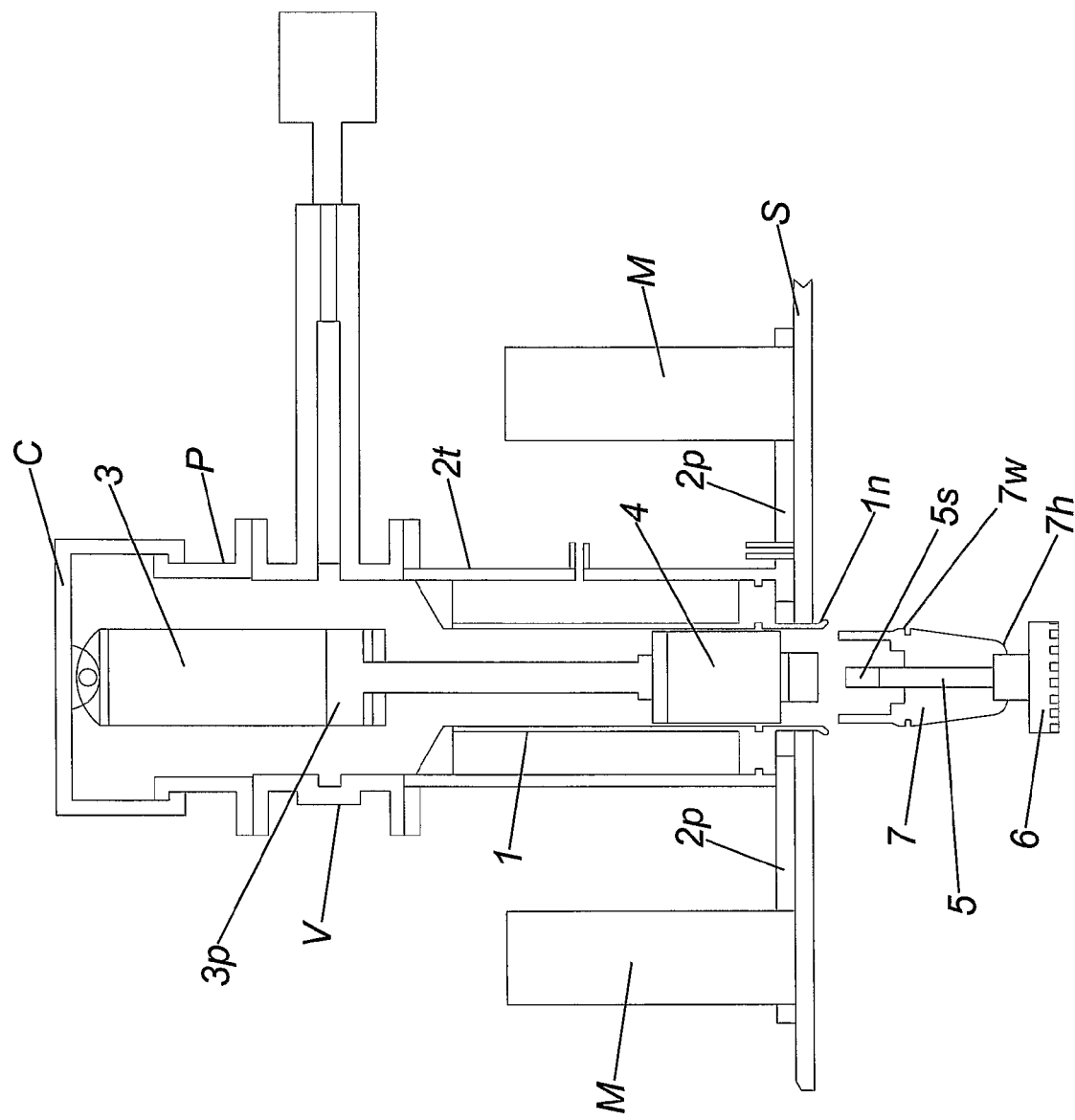

The lower end of the pipe 1 has a neck 1n. The neck 1n comprises a lip that protrudes radially inwards around the inner circumference of the bore of the pipe 1, at the lowermost end of the pipe that is protruding beyond the lower surface of the structure S, so that the lip clears the lower surface of the structure S. The lip typically comprises a continuous or discontinuous line of solder or weld, laid onto the inner surface of the pipe 1, adjacent its opening. The lip extends inwards by a predetermined distance that has an internal diameter that is wider than the external diameter of the head 7h of the drift, but narrower than the apex 7w. This permits the head 7h to pass through the inwardly extending lip without deforming it, but since the apex 7w of the drift 7 is wider than the internal diameter of the circumferential lip, it is eventually driven into engagement with the lip by the continued downward force exerted by the cylinder 3. At this point of engagement, the apparatus is substantially in the configuration shown in FIG. 3, with the widest part of the drift 7 at the apex 7w pressing on the inner surface of the lip at the neck 1n of the pipe 1. The neck 1n of the pipe 1 is more malleable than the drift 7, and continued force applied from the cylinder 3 pushes the apex 7w of the drift down through the lip, causing it to deform radially outwards until the drift 7 passes entirely through the neck 1n of the pipe 1 as shown in FIG. 4. After passage of the drift 7 through the neck 1n of the pipe 1, the outer diameter of the neck 1n of the pipe 1 is flared radially outwards, and is wider than the aperture 2a. The dimensions of the aperture 2a, the pipe 1, and the apex 7w of the drift 7 are chosen in close tolerance with one another, so that the passage of the drift 7 swages the outer diameter of the neck 1n of the pipe 1 securely to the surface S.

The drill stem 5 is optionally connected to the drill motor 5 by means of a spline 5s that transmits torque between the motor 4 and the drill stem 5 when the drill stem 5 is pressed upwards against the lower end of the motor 4, but when the drill bit 6 is not supported from below, the spline 5s does not retain the drill stem 5 on the drill motor, and it is free to drop away. Thus, when the apex 7w passes the lip at the neck 1n of the pipe 1, there is substantially no force retaining the drill stem 5 on the motor 4, and the drift 7, the stem 5 and the bit 6 drop out of the lower end of the motor 4 and fall into the structure S. At that point, the piston 3p can be retracted in the cylinder 3 in order to remove the drill motor 4 from the bore of the pipe 1, because the pipe 1 is by now securely fastened to the structure S by means of the swage at the neck 1n. Typically the cylinder 3 retracts the motor 4 above the level of the valve, which is then closed, after which the removable cap C can be recovered to surface along with the hydraulic cylinder 3 and motor 4, to be prepared for the next job. The upper seat of the valve housing V can then be connected to a further fluid conduit for removal of fluids from the structure, which can then flow up through the aperture 2a into the bore of the pipe 1, through the open valve, and into the further conduit for recovery.

If desired, the guide tube 2t and guide plate 2p can remain in place with the magnets M and the circlips securing the assembly to the structure S. In some embodiments, the shear pins or seals between the drift 7 and the pipe 1, and the circlip between the flange 1f and the guide tube 2t are optional, and can be omitted, with the apex 7w of the drift 7 being a friction fit within the bore of the pipe 1, and the flange 1f likewise being a friction fit within the bore of the guide tube 2t. In such embodiments, once the neck of the pipe 1 is fully swaged to the structure, the drift 7, drill stem 5 and drill bit 6 have been dropped into the structure S, and the motor 4 has been retracted above the closed valve, the magnets M can be removed, leaving the swage at the neck of the pipe 1 as the only structural connection between the pipe 1 and the structure S.

FIG. 7 shows an alternative design of drift that is radially expandable between a radially expanded configuration shown in FIG. 7a, and a radially retracted configuration shown in FIG. 7b. As shown in FIG. 8, an alternative design of drift can have a bearing race housed in slots in the upper surface of the drift in order to bear against a separate cylindrical spacer ring for transmitting force from the piston 3p via the drill motor 4, and thereby isolating the drift 7 from torque applied by the motor 4 to the drill stem 5. As shown in FIG. 9, the head of the drift can optionally have an irregular oval (or other) shape in order to increase cutting pressure at particular rotational positions on the drift, and reduce the force required from the cylinder 3 in order to push the drift through the neck of the pipe 1. FIG. 10 shows a further design of drift similar to the drift described in FIGS. 1 to 4, but omitting the shear pins at the apex. Bearings can optionally be inserted in the slots at the upper and lower end of the bore through the centre of the drift.

FIGS. 11 and 12 show a modified design of drift 17 having a wide upper apex 17w, a relatively narrow lower head 17h, a central bore with inward (or upward) facing bearings to bear against the drill stem 5, and an arrangement of radially sprung shear pins 17s. The drift 17 is suitable for use with a connection sleeve 11 that performs the same function as the pipe 1 in earlier embodiments. The connection sleeve 11 is shown in FIG. 12, having a neck 11n with a lip 11l that protrudes radially inwards into the bore of the sleeve 11. The sleeve 11 also has a shoulder 11s that extends radially outwards from its outer surface. Sleeve 11 also has a circumferential slot 11c to receive the shear pins 17s on the drift 17.

FIG. 13 is a separate view of the drift 17 engaging the upper surface of a drill bit 6. The drift 17 is held stationary within the pipe 1 as the bit 6 rotates underneath it.

FIG. 14 shows an alternative design of drift having a step in the head adapted to engage with the inner surface of the sleeve, and to push it axially downwards within the pipe 1 before the apex of the modified drift starts to expand the neck.

Figure 15:
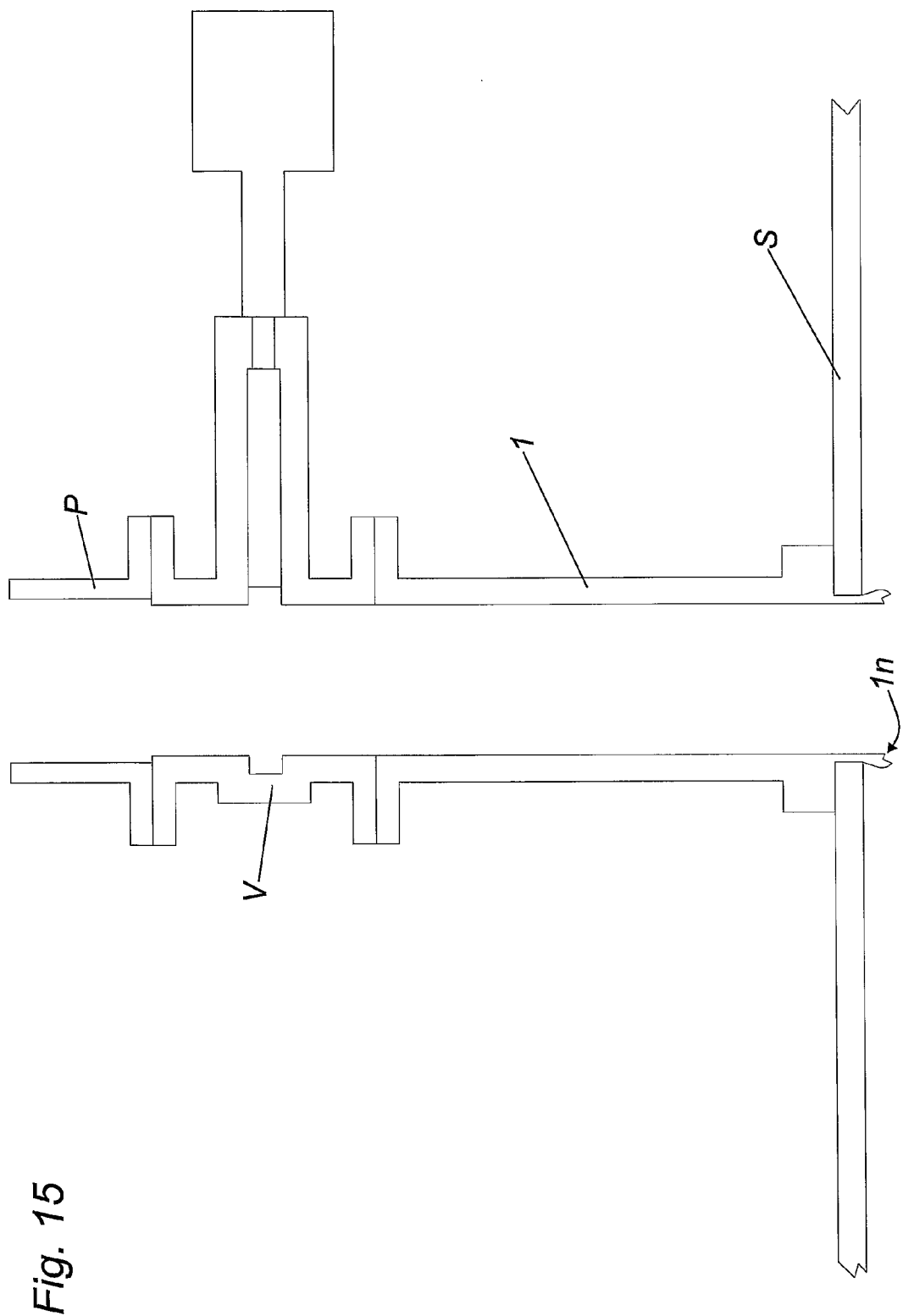
FIG. 15 shows a pipe attached to the structure after removal of the guide frame.

After swaging of the pipe 1 and removal of the guide tube 2t and guide plate 2p in certain embodiments, the attached pipe 1 has the configuration shown in FIG. 15, with the neck 1n of the pipe 1 being swaged outwardly by the downward movement of the drift 7.

Figure 16:
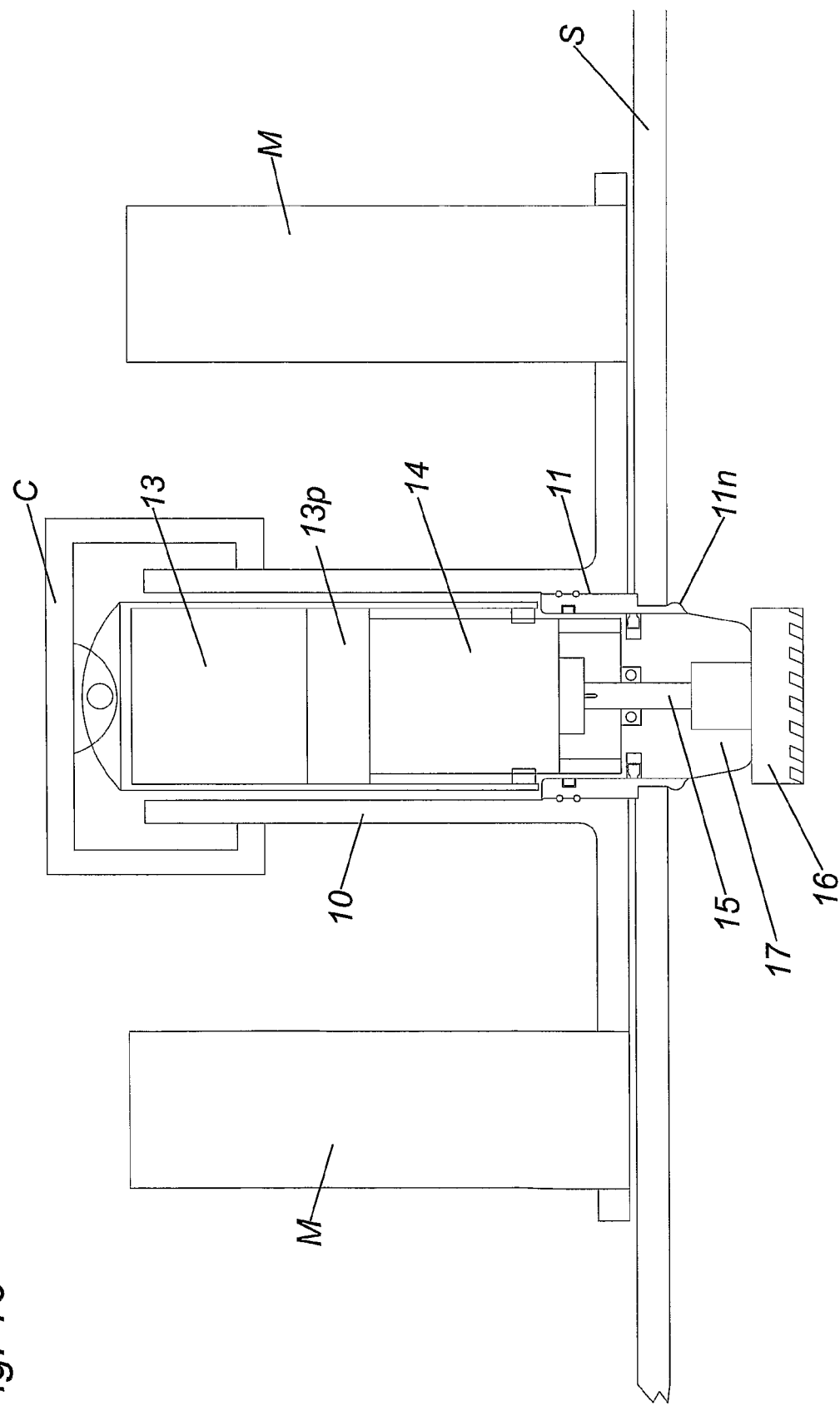
FIG. 16 shows a side view of a second method of attaching a pipe to a structure.

FIG. 16 shows a further embodiment using the modified drift 17 and sleeve 11. The FIG. 16 embodiment secures a flanged pipe 10 having a central bore containing a hydraulic cylinder 13 with a piston 13p that exerts force on a drill motor 14, a drill stem 15 and a drill bit 16 in the same way as previously described. In the FIG. 16 embodiment, the flange of the pipe 1 is temporarily connected to the structure S by means of magnets M, and the bit 16 and the associated equipment above it is retracted into the bore of the flanged pipe 10 above the surface S to be cut. Initially, the piston 13p is withdrawn up to the top of the cylinder 13, and the drift 17 is located above the sleeve 11. Below the sleeve 11, the drill bit 16 is located just within the open end of the bore of the pipe 10. The sleeve 11 is initially withdrawn into the bore of the pipe 10, and is spaced away from the open end of the bore by at least the distance of the drill bit 16. When the pipe 10 is to be secured to the structure S, the motor 14 is actuated to rotate the bit 16 as previously described, and the piston 13p is extended to drive the bit 16 through the surface S. The diameter of the hole cut by the bit 16 is sufficient to permit passage of the head 11n of the sleeve 11, and the lower surface of the motor 14 drives the drift 17 down until it engages the upper surface of the sleeve 11 at the apex 17w of the drift 17, to push the sleeve 11 down the bore of the flanged pipe 10 and through the hole cut by the bit 16. In certain embodiments, the FIG. 14 embodiment of the drift can be used so that the square lip on the lower end of the head makes a more positive initial contact with the upper edge of the sleeve 11.

The drift 17 thus pushes the sleeve 11 down through the hole cut through the surface S until the shoulder 11s on the outer surface of the sleeve 11 engages the upper surface of the structure S. The shoulder 11s has a larger diameter than the hole, and cannot pass through it, so further extension of the piston 13p does not move the sleeve any further, but does drive the drift 17 axially downwards through the inner bore of the sleeve 11, thereby expanding it radially outwards. At some point along this travel, the shear pins 17s on the outer surface of the drift 17 engage within the circumferential ring 17c on the inner surface of the sleeve 1', thereby locking the drift 17 to the sleeve 11.

Further downward force is exerted by the piston 13p on the drift 17, and eventually shears the pins 17s, causing the drift 17 to move rapidly downwards through the bore of the sleeve 11. This downward movement of the wide apex 17w of the drift 17 through the neck 11n of the sleeve 11 swages the neck 11n radially outwards underneath the lower surface of the structure S, thereby securely swaging the sleeve 11 to the structure S. After the drift 17 has passed completely through the sleeve 11, it can drop along with the drill stem 15 and bit 16 from the lower surface of the motor 14 in the same way as previously described, allowing the retraction of the motor 14 and piston 13p for later operations. As before, the magnets M can optionally be removed at this point, or can remain in place as additional fastening means for the flanged pipe 10.

In certain embodiments similar to FIG. 16, a circlip or other securing means can be used in order to fasten the sleeve 11 to the inner surface of the bore of the flanged pipe 10, and o-rings can optionally be provided in order to provide fluid seals between the sleeve 11 and the pipe 10.

Figure 17:
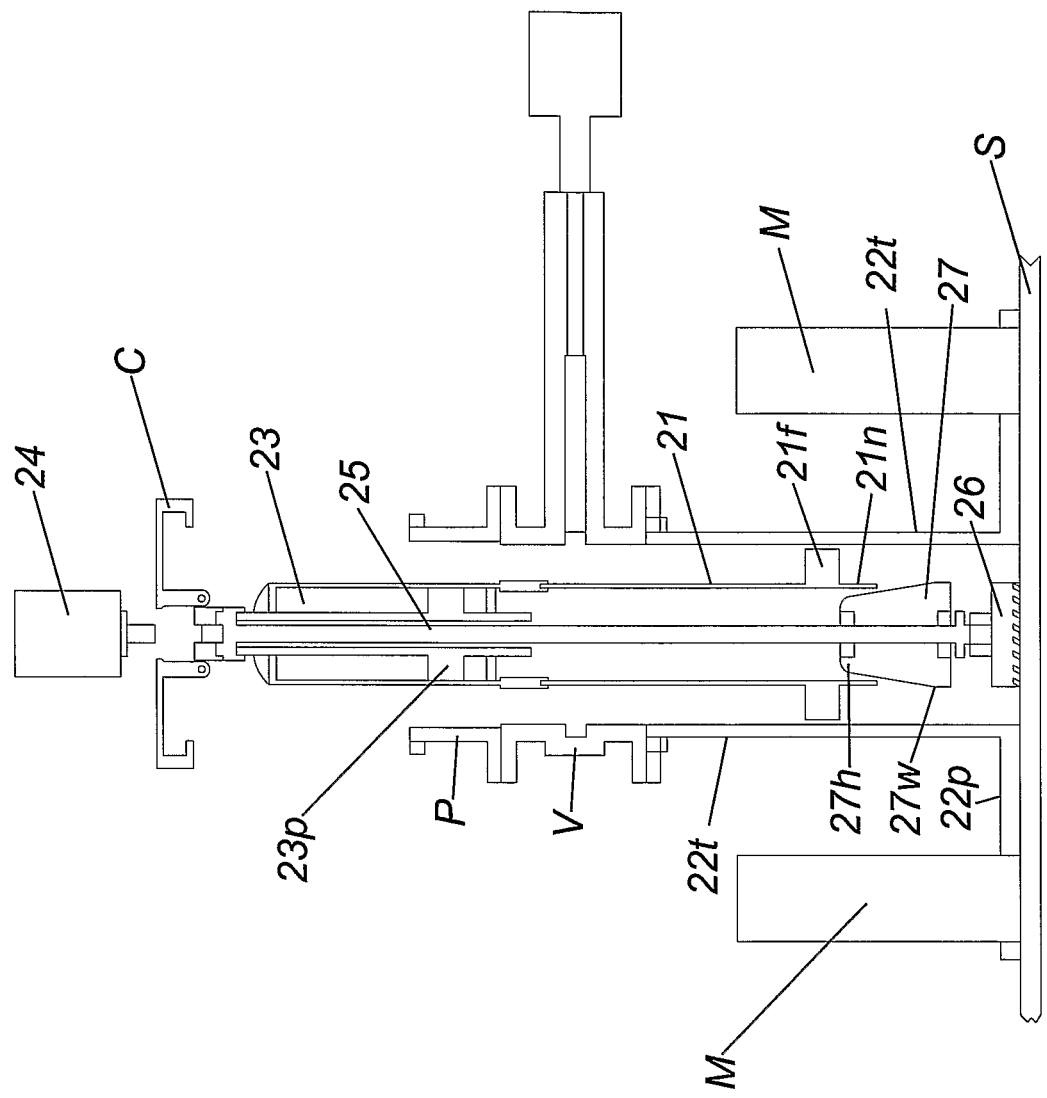
FIG. 17 shows a third method and apparatus for attaching a pipe to a structure.
Figure 18:
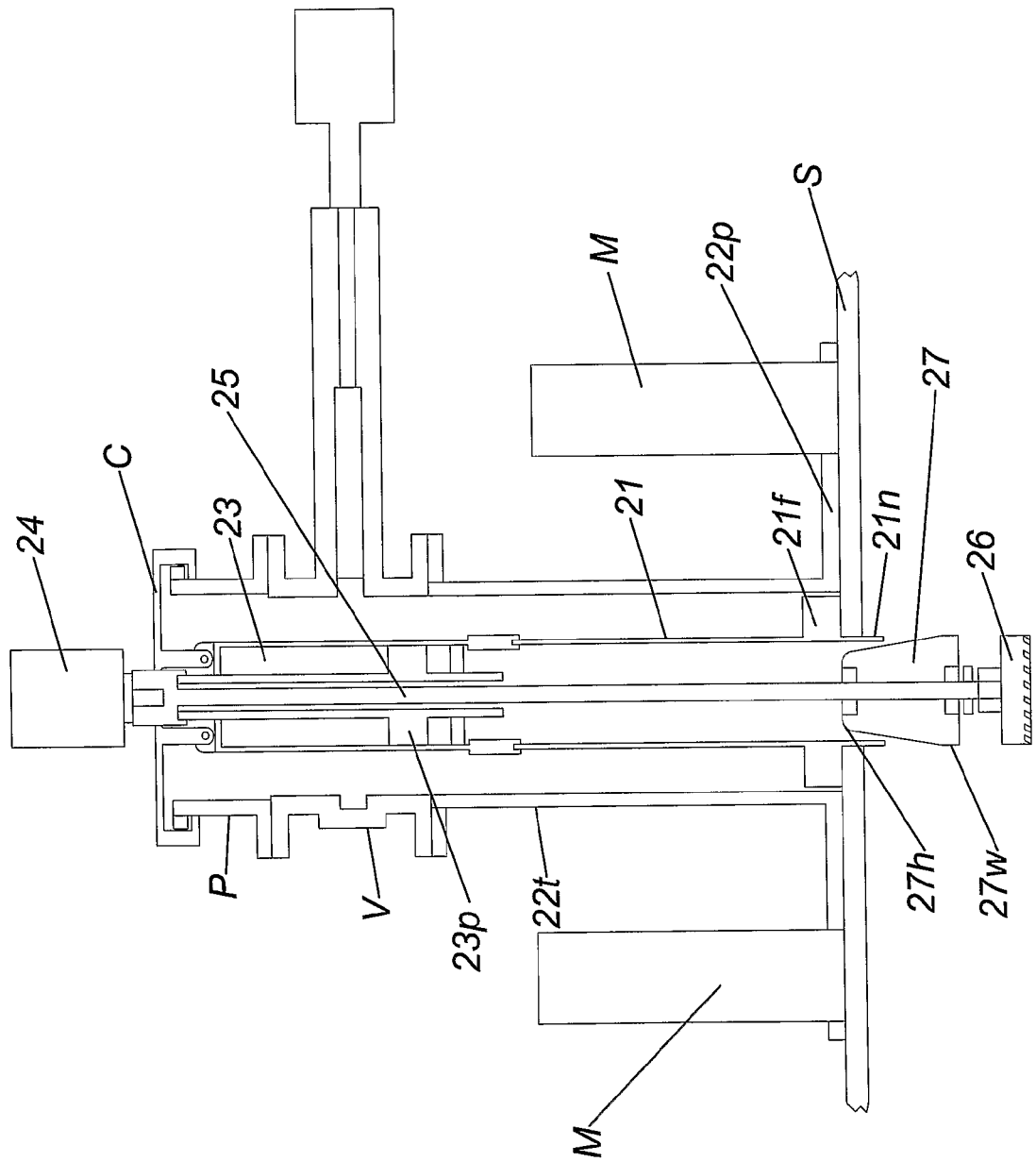
FIG. 18 shows a further view of the FIG. 17 method and apparatus.
Figure 19:
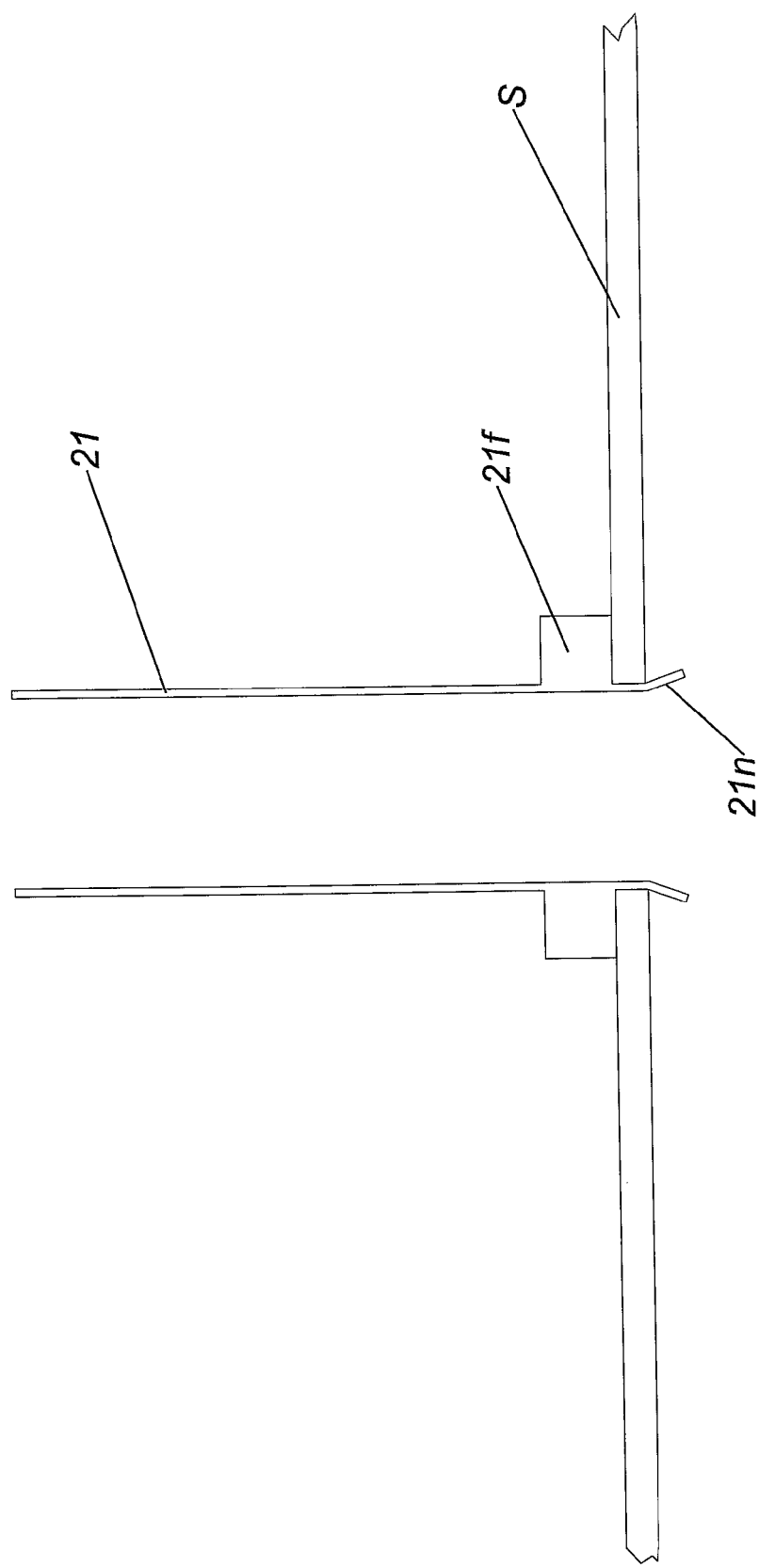
FIG. 19 shows a pipe attached to the structure by the third method.

A further embodiment of apparatus for connecting a pipe 21 is shown in FIGS. 17 and 18, with an attached pipe being shown according to this method in FIG. 19.

In the FIG. 17 embodiment, a guide tube 22t is provided with a flange 22p held onto a surface S temporarily by magnets M as previously described. The bore of the guide tube 22t is straight, having no lip at its lower end, so that a flange 21f of a pipe 21 to be attached to the structure S is pressed directly onto the outer surface of the structure S once the hole is cut. The modified embodiment has a valve housing V and a spacer P as previously described. There is also a motor 24 driving a drive shaft 25 and a hydraulic cylinder 23 driving a piston 23p. However, in the modified embodiment of FIG. 17, a drift 27 is loaded into the apparatus above the drill bit 26 but below the neck 21n of the pipe 21, with the head 27h of the drift 27, which is narrower than the inner bore of the pipe 21, being arranged inside the bore of the pipe 21 and pointing upwards, and the apex 27w of the drift 27, which is wider than the bore of the pipe 21 in the region of the neck 21n, being arranged below and outside the pipe 21. The hydraulic cylinder 23 operates to pull the drift 27 upwards through the bore of the pipe 21 once the cap C has been secured onto the upper face of the spacer P, and the motor 24 arranged above the cap C operates the bit 26 through an elongate shaft 25 that passes through the hydraulic cylinder 23, the pipe 21, and the drift 27, before engaging with the drill bit 26.

In operation, the FIGS. 17 and 18 embodiment is assembled and fed into the guide tube 22t, the valve housing V and the spacer P with the valve being open, and the cap C is secured to lock the assembly onto the upper face of the spacer P. The motor 24 is then engaged to drive the drill stem 25 and rotate the bit 26 in order to cut a hole through the face of the structure S. The hydraulic piston 23p can be initially set midway through the cylinder 23, in order to drive the downward movement of the drill bit 26 through the face of the structure S, and the reaction force required for this can be held by the magnets M securing the flange 22p to the structure S. Once the drift 27 and the drill bit 26 have advanced through the structure S, the flange 21f on the outer surface of the pipe 21 engages the upper surface of the structure S, because it is narrower than the hole cut by the drill bit 26. At this position, the neck 21n of the pipe 21 protrudes axially below the lower surface of the structure S. After this point, the motor 24 can be stopped and the hydraulic cylinder 23 can be operated in reverse to pull the drill stem 25 axially upwards within the bore of the pipe 21, so that the head 27h of the drift 27 pushes up into the neck 21n of the pipe 21. Although the head 27h of the drift 27 is narrower than the inner diameter of the neck 21n, the continued movement of the drift 27 into the neck 21n reaches a point at which the outer surface of the drift 27 engages with the lower surface of the neck 21n, and deforms the neck radially outwards. Eventually the widest part of the drift 27 at the apex 27w is pulled upwards to swage the neck 21n of the pipe 21, and thereby connect it securely to the structure S.

Optionally, the dimensions of the drift 27, the neck 21n and the hole through the structure S made by the drill bit 26 can be chosen so that the drift 27 can pass upwards all the way through the neck 21n and be recovered through the central bore of the pipe 21 after swaging of the neck 21n (with or without an inner lip) is complete. Alternatively, after the neck 21n has been swaged to a satisfactory extent to secure the pipe 21 to the structure S, the drift 27, drill stem 25 and drill bit 26 can be released from the motor 24 by splines in the manner previously described, and can drop into the structure. The magnets M may then be removed, and the hydraulic cylinder retracted into the spacer P in order to allow closure of the valve. Alternatively, the magnets M can remain as additional anchoring components for the guide tube 22t which can remain in place after the hydraulic cylinder 23 and motor 24 have been recovered to surface for another job. Alternatively, the valve can be used to allow controlled attachment of a further conduit to the pipe 21, and removal of the entire assembly to leave only the pipe 21 attached to the structure S by means of the swage at the neck 21n as shown in FIG. 19.

This embodiment is particularly suitable for the attachment of pipes for injection of fluids, for example for injection of compressed air into the structure in order to inflate it or otherwise impart buoyancy to it.

Figure 20:
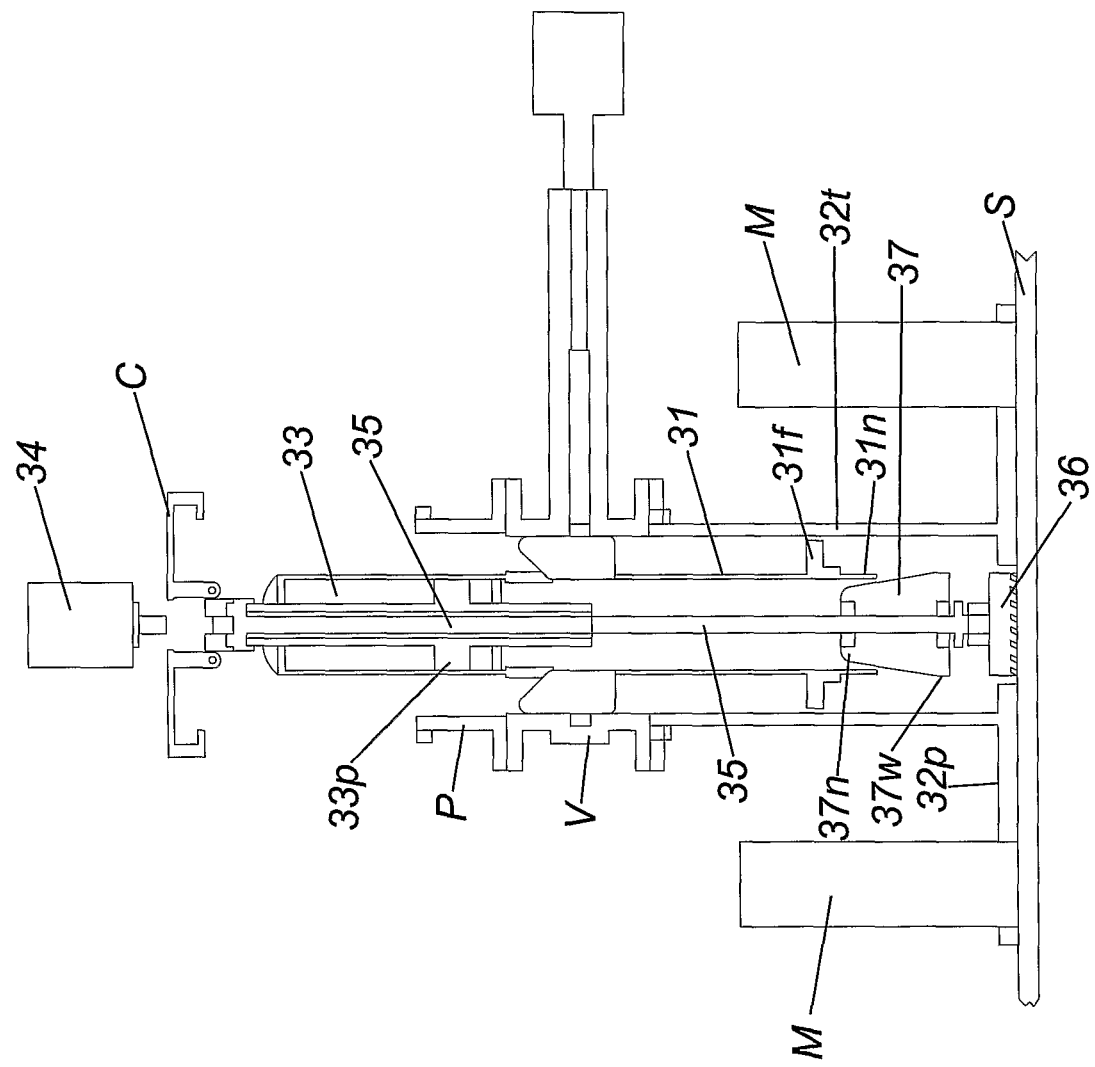
FIGS. 20 and 21 show sequential views of a fourth method and apparatus for attaching a pipe to a structure.
Figure 21:
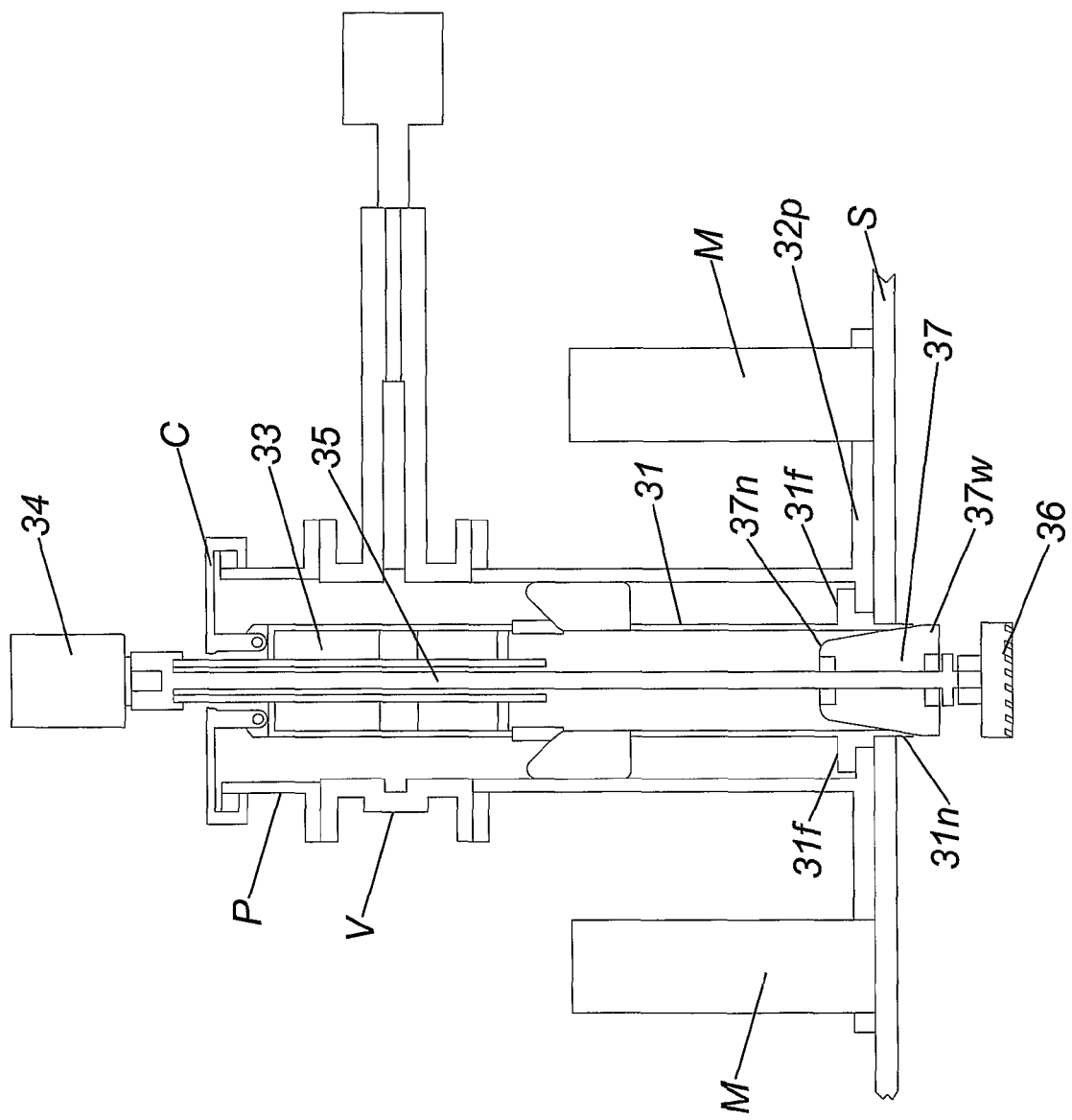
Figure 22:
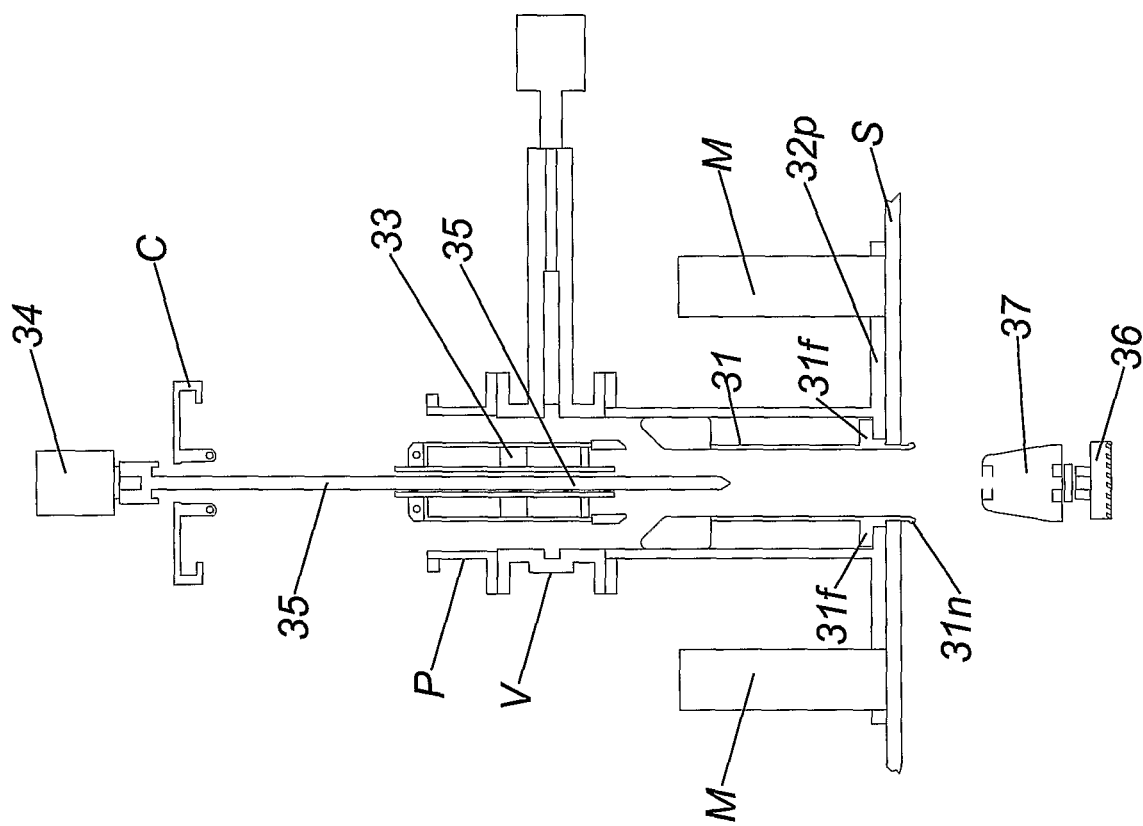
FIG. 22 shows the fourth embodiment of the apparatus being withdrawn from the pipe.

A similar embodiment of apparatus for connecting a pipe 31 is shown in FIGS. 20-22.

In the FIG. 20 embodiment, a guide tube 32t is provided with a flange 32p held onto a surface S temporarily by magnets M as previously described. The bore of the guide tube 32t has a lip at its lower end, with an aperture to accept the drill bit 36. A flange 31f of a pipe 31 to be attached to the structure S is contoured to fit within the aperture and to engage an upper portion of the flange profile directly onto the outer surface of the lip. The FIG. 20 embodiment has a valve housing V and a spacer P as previously described. There is also a motor 34 driving a drive shaft 35 and a hydraulic cylinder 33 driving a piston 33p. Like the previous embodiment, in the modified embodiment of FIG. 20, a drift 37 is loaded into the apparatus above the drill bit 36 but below the neck 31n of the pipe 31, with the head 37h of the drift 37, which is narrower than the inner bore of the pipe 31, being arranged inside the bore of the pipe 31 and pointing upwards, and the apex 37w of the drift 37, which is wider than the bore of the pipe 31 in the region of the neck 31n, being arranged below and outside the pipe 31. The hydraulic cylinder 33 operates to pull the drift 37 upwards through the bore of the pipe 31 once the cap C has been secured onto the upper face of the spacer P, and the motor 34 arranged above the cap C operates the bit 36 through an elongate shaft 35 that passes through the hydraulic cylinder 33, the pipe 31, and the drift 37, before engaging with the drill bit 36.

In operation, the FIG. 20 embodiment is assembled and fed into the guide tube 32t, the valve housing V and the spacer P with the valve being open, and the cap C is secured to lock the assembly onto the upper face of the spacer P. The motor 34 is then engaged to drive the drill stem 35 and rotate the bit 36 in order to cut a hole through the face of the structure S. The hydraulic piston 33p can be initially set midway through the cylinder 23, in order to drive the downward movement of the drill bit 36 through the face of the structure S, and the reaction force required for this can be held by the magnets M securing the flange 32p to the structure S. Once the drift 37 and the drill bit 36 have advanced through the structure S, the flange 31f on the outer surface of the pipe 31 engages the upper surface of the lip of the hole. At this position, the neck 31n of the pipe 31 protrudes axially below the lower surface of the structure S. After this point, the motor 34 can be stopped and the hydraulic cylinder 33 can be operated in reverse to pull the drill stem 35 axially upwards within the bore of the pipe 31, so that the head 37h of the drift 37 pushes up into the neck 31n of the pipe 31. Although the head 37h of the drift 37 is narrower than the inner diameter of the neck 31n, the continued movement of the drift 37 into the neck 31n reaches a point at which the outer surface of the drift 37 engages with the lower surface of the neck 31n, and deforms the neck radially outwards. Eventually the widest part of the drift 37 at the apex 37w is pulled upwards to swage the neck 31n of the pipe 31, and thereby connect it securely to the structure S.

Optionally, the dimensions of the drift 37, the neck 31n and the hole through the structure S made by the drill bit 36 can be chosen so that the drift 37 can pass upwards all the way through the neck 31n and be recovered through the central bore of the pipe 31 after swaging of the neck 31n (with or without an inner lip) is complete. Alternatively, after the neck 31n has been swaged to a satisfactory extent to secure the pipe 31 to the structure S, the drift 37, drill stem 35 and drill bit 36 can be released from the motor 34 by splines in the manner previously described, and can drop into the structure as shown in FIG. 22. The magnets M may then be removed, and the hydraulic cylinder retracted into the spacer P in order to allow closure of the valve. Alternatively, the magnets M can remain as additional anchoring components for the guide tube 32t which remains in place after the hydraulic cylinder 33 and motor 34 have been recovered to surface for another job.

Figure 27:
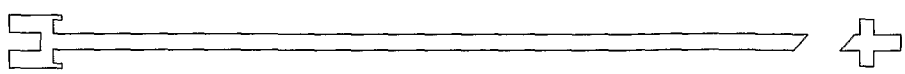
FIGS. 23-27 show alternative views of drill stems for use in any of the apparatus described herein.
Figure 26:
Figure 25:
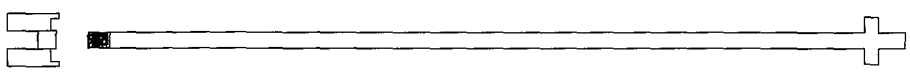
Figure 24:
Figure 23:
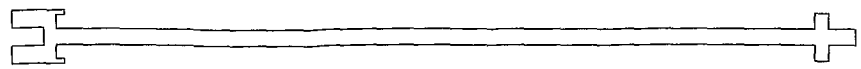

FIG. 23-29 show different designs of drill stem. FIG. 23 shows a solid drill stem that is not adapted to permit dropping of the drift into the structure. FIG. 24 shows a modified stem in which the head of the stem is connected to the shaft by a thread that is adapted to disengage the head and the shaft when the motor is reversed. FIGS. 28 and 29 show close-up views of different embodiments of the head and thread suitable, optionally using a ball thread. FIGS. 26 and 27 show sequential views of the operation and separation of a sacrificial drill stem, with a weakened point adjacent its lower end that is adapted to fatigue and fail when subjected to high torque by the motor, and to separate allowing the drift to drop with the lower part of the stem into the structure.

Figure 30:
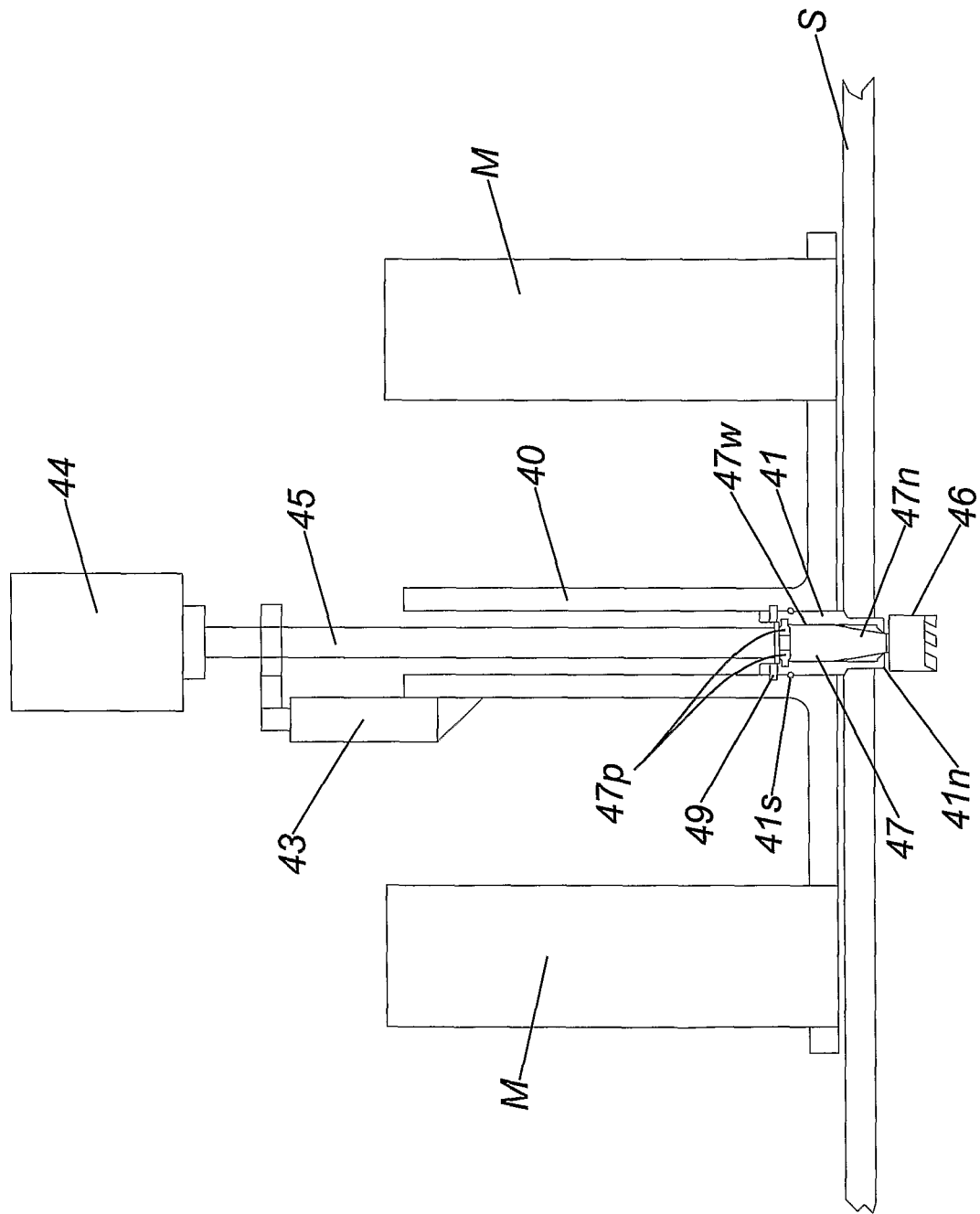
FIG. 30 shows a side view of a fifth method and apparatus for attaching a pipe to a structure.

FIG. 30 shows a further modified embodiment used for connecting a small diameter pipe 40 to a structure S. This is particularly suitable for narrow pipes of, for example, 2-inch bore, that are unsuitable for accommodating a drill assembly within the bore of the pipe 40. In this embodiment, the hydraulic cylinder 43 is arranged on a side bracket connected to the pipe and engages the drill stem 45 by means of a thrust bearing. The drill motor 44 is located above the thrust bearing. A sleeve 41 connected to the pipe 40 by means of a circlip 49 is provided at the lower end of the bore of the pipe 40 adjacent to the structure S, and in its initial position, the sleeve 41 and the drill bit 46 below it are withdrawn, by means of the hydraulic cylinder 43 acting on the thrust bearing, within the bore of the pipe 40 while the flange of the pipe is being connected to the outer face of the structure S. In that upper position where the sleeve 41 is withdrawn within the bore of the pipe 40, the circlip 49 is pressed into the annular groove on the outer surface of the sleeve 41, permitting the sleeve 41 to slide freely within the bore of the pipe 40. When the flange of the pipe 40 is attached to the outer surface of the structure S by means of the magnets M, the motor 44 is started in order to rotate the drill bit 46, and the hydraulic cylinder 43 is actuated in order to drive the drill stem 45, sleeve 41, and the drill bit 46 axially downwards in the bore of the pipe 40, so that the bit 46 cuts through the outer surface of the structure S. As the circlip 49 is pressed radially into the annular slot in the outer surface of the sleeve 41, the sleeve 41 is free to slide axially within the bore of the pipe 40. When the hydraulic cylinder 43 is extending in order to push the drill bit 46 down the bore of the pipe 40 towards the outer surface of the structure S, the head 47h of the drift extends a short way into the bore of the sleeve 41, and when the tapered sides of the head 47h engage the inner edge of the rim of the bore of the sleeve 41, the drift 47 starts to move the sleeve 41 axially down the bore of the pipe 40. The downward movement driven by the hydraulic cylinder 43 eventually pushes the drill bit 46 through the structure S, and the head 47h of the drift 47 pushes the lower part of the sleeve 41 with the reduced diameter into the hole made by the drill bit 46. When the shoulder on the outer surface of the sleeve 41 is pressed against the outer surface of the structure, the sleeve 41 is prevented from further movement down the bore of the pipe 1. At this stage, the sleeve 41 is in the position shown in FIG. 30, with the neck 41n of the sleeve 41 protruding from the inner surface of the structure S. As in earlier embodiments, the neck 41n has a lip that protrudes radially inwards into the bore of the sleeve 41, and the lip is wider than the head 47h, but narrower than the apex 47w of the drift 47.

When the outer shoulders on the sleeve 41 are engaging the outer surface of the structure S, the circlip 49 is axially aligned with an annular groove on the inside surface of the pipe 40, so that when the sleeve 41 reaches this axial position, in the bore of the pipe 40, the circlip 49 expands into the annular groove, locking the sleeve 41 to the pipe 40.

Further downward movement of the hydraulic cylinder 43 does not move the sleeve 41, but does drive the drift 47 into the bore of the sleeve 41, and at the point shown in FIG. 30, a pair of shear pins 47p that are biased by springs and radial bores of the drift 47 engage an annular groove on the inside surface of the bore of the sleeve 41, thereby locking the drift 47 to the sleeve 41.

At this point, the hydraulic cylinder 43 can be further extended in order to shear the pins 47p and drive the drift 47 all the way through the inner bore of the sleeve 41. Once the apex 47w of the drift 47 passes through the neck 41n of the sleeve 41, the lip at the neck 41n is pressed out radially to deform the neck 41n below the inner face of the structure S, thereby swaging the sleeve 41 to the structure S. The circlip 49 maintains the mechanical connection between the sleeve 41 and the pipe 40, and at that stage, the magnets M, the motor 44, the hydraulic cylinder 43, and the drill stem 45 can be removed as previously described, leaving the drift 47 and the bit 46 to drop from a splined one way connection on the lower end of the drill stem 45. The mechanical connection between the pipe 40 and the structure S is then maintained by the swaged neck 41n of the sleeve 41, and the circlip 49.

It should be noted that the shear pins 47p are optional in this and all other embodiments. Also, an o-ring seal 41s can optionally be provided between the sleeve 41 and the pipe 40 (and in other embodiments) in order to restrain the flow of fluids if desired. In certain variations of this embodiment, the magnets M can remain to provide additional mechanical connection between the pipe 1 and the structure S.

Figure 31:
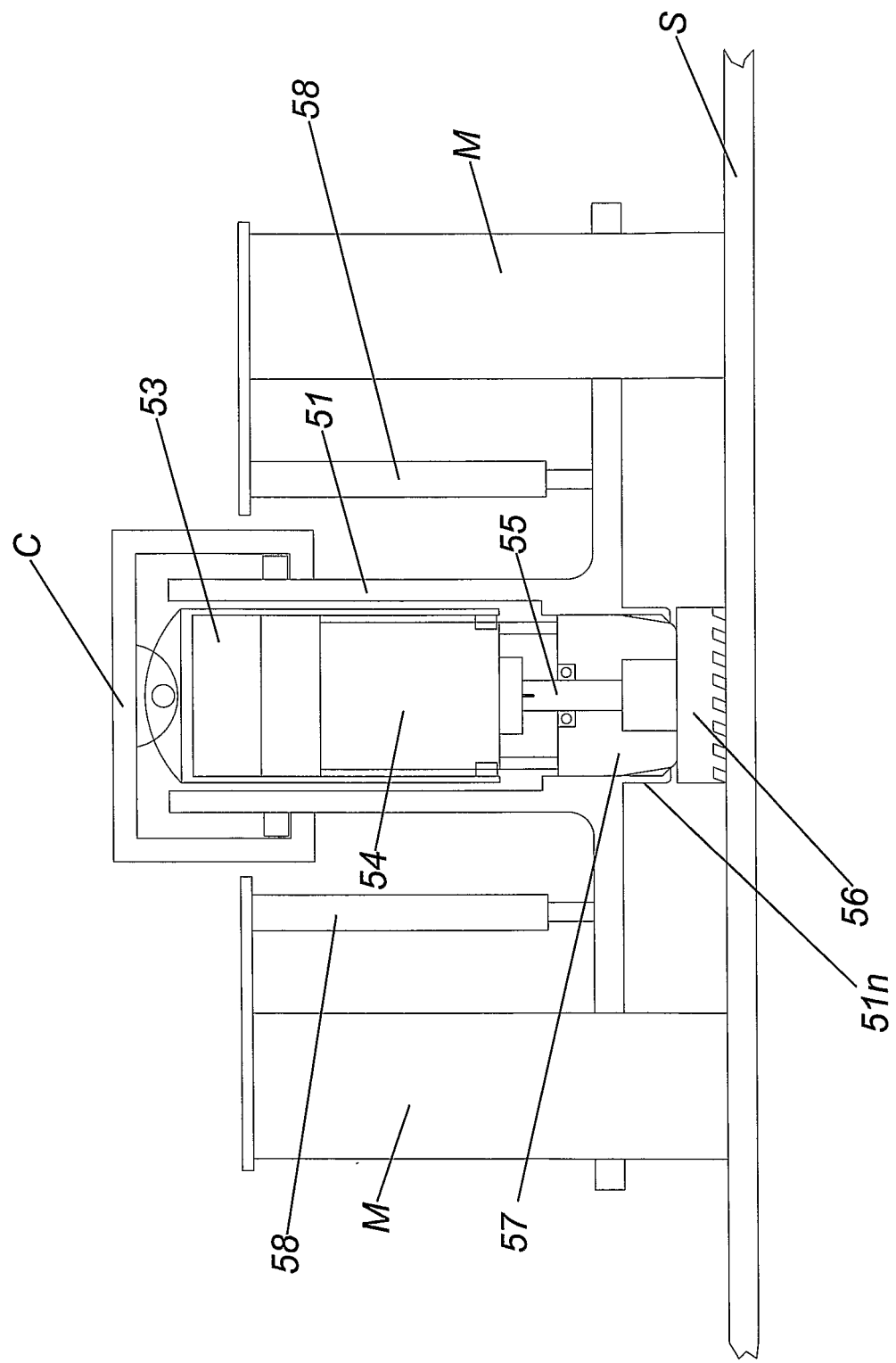
FIG. 31 shows a side view of a sixth method and apparatus for attaching a pipe to a structure.

FIG. 31 shows a further embodiment where a large bore pipe 51 is to be connected to a structure S. The large bore pipe 51 has a flange that is apertured to receive two magnets M. The magnets M support hydraulic cylinders 58 that bear on the upper surface of the flange and allow axial force to be applied to move the pipe 51 towards and away from the surface S. Hydraulic cylinder 53 mounted on a cap C as previously described is provided in the bore of pipe 51, and connects to a drift 57 by means of a drill stem 55 as previously described. Below the drift 57, a drill bit 56 is rotated by the drill stem 55 connected to a motor 54 below the hydraulic cylinder 53 in order to cut a hole through the structure S to receive the neck 51n of pipe 51.

Figure 32:
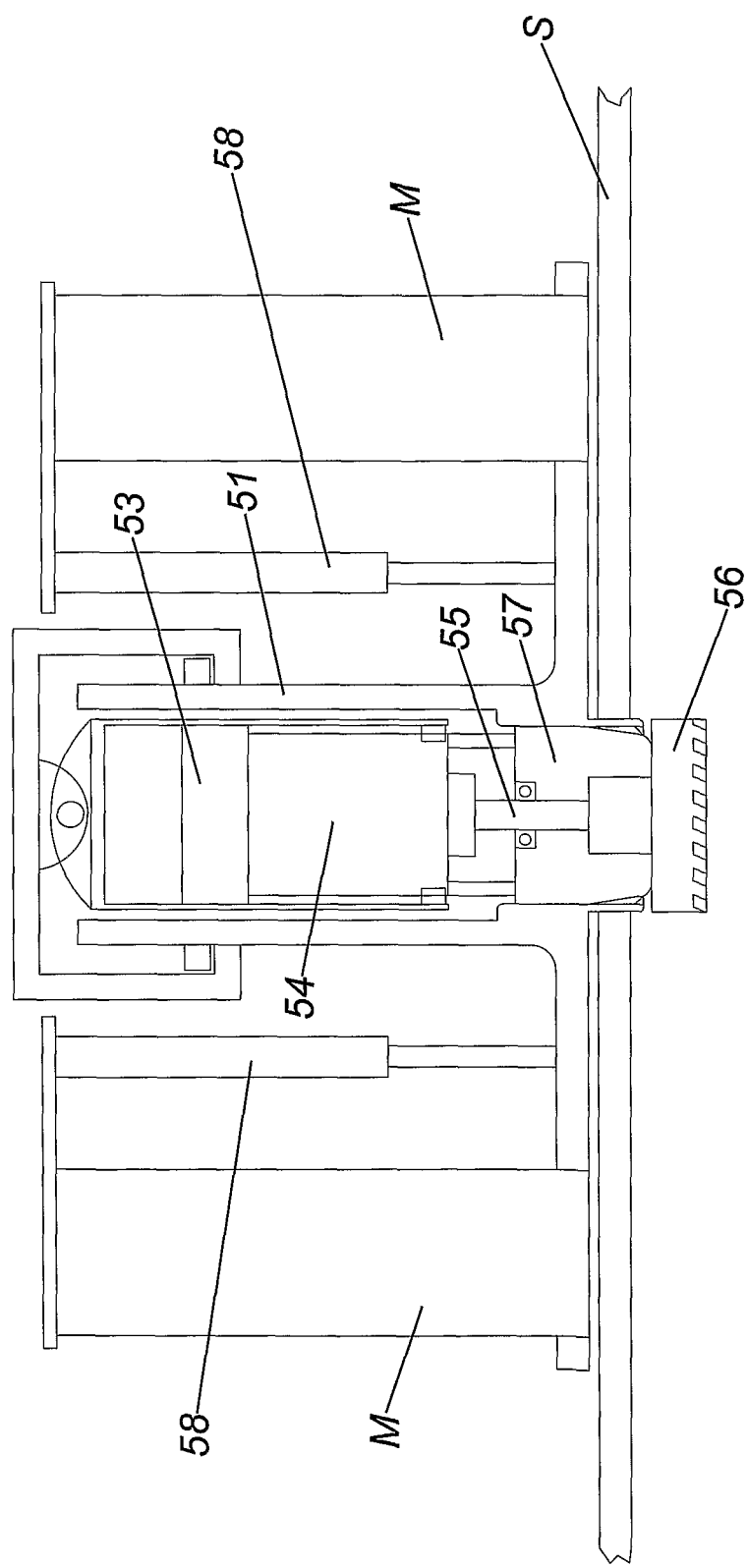
FIG. 32 shows a further view of the sixth method and apparatus.

In the embodiment of FIGS. 31 and 32, the motor 54 is activated to rotate the drill bit 56. The downward force for the cutting action is optionally provided by the hydraulic cylinders 58 acting between the magnets M and the flange of the pipe 51, so that the drill bit 56 is forced through the structure S to cut the access hole for the neck 51n of the pipe 51. Optionally, some of the driving force for axial movement of the drill bit 56 can also be provided by the hydraulic cylinder 53, provided that the drift 57 is not driven through the neck 51n until after the neck 51n has cleared the lower face of the structure S. In most embodiments, the force pushing the drill bit 56 through the structure S will be provided by the external cylinders 58, which press down on the whole assembly so that the neck 51n is pushed through the hole cut by the drill bit 56. Once the flange of the pipe 51 is flush against the outer surface of the structure S, and the neck 51n of the pipe 51 protrudes from the inner surface of the structure S, the hydraulic cylinder 53 can be actuated in order to drive the drift 57 through the neck 51n of the pipe 1, thereby radially expanding the lip on the inner surface of the neck 51n, and swaging the neck 51n to the structure S. After the neck 51n has been satisfactorily swaged to the structure S, the drill stem 55 and drift 57 can be allowed to drop into the structure by disengagement of a spline between the drill stem 55 and the motor 54, and the entire assembly can be recovered to surface, leaving only the pipe 51 swaged to the structure S.

In optional variations of this embodiment, the piston 53p and typically the motor 54 can be splined to the casing for the cylinder 53. Also bearings can typically be provided between the drift 57 and the drill stem 55.

FIG. 33 shows an arrangement for a typical hydraulic cylinder 63. Typically, a Gyrotor™ motor 64 is bolted to the lower surface of a piston 63p, and is optionally splined to the cylinder 63 in order to prevent relative rotation between the motor 64 and the casing of the cylinder 63. Hydraulic hoses can be routed through the upper potion of the cylinder 63 in order to power the motor 64, and suitable ports can be provided through the piston 63p for this purpose.

Figure 34:
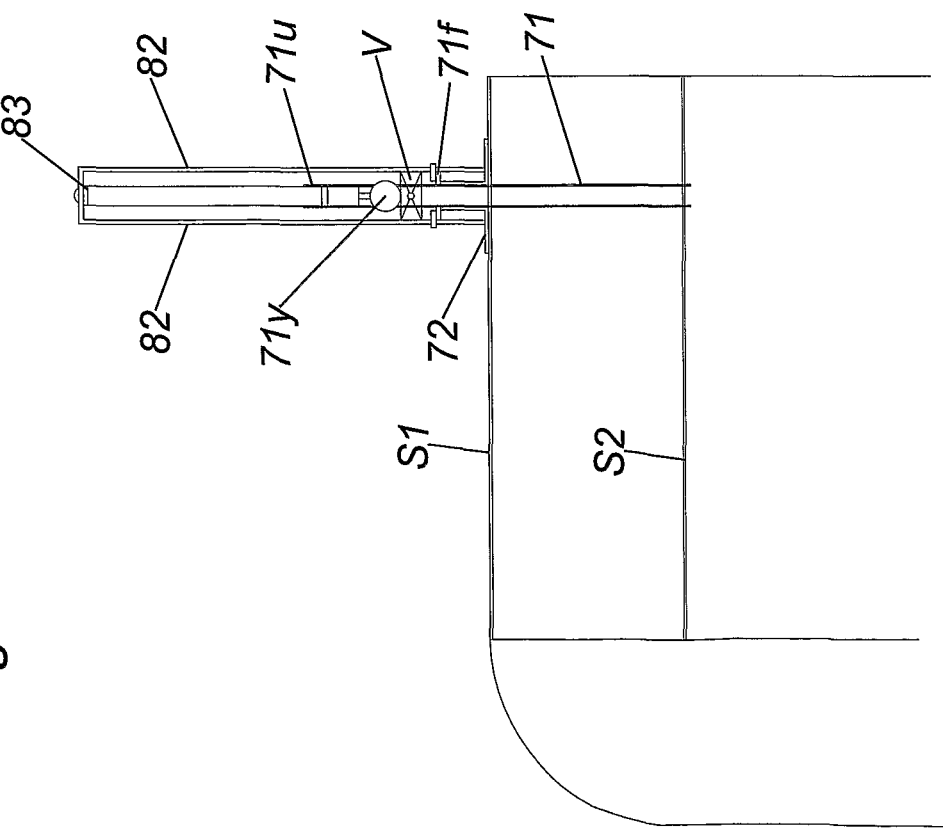
FIG. 34 shows a front view of a seventh embodiment of apparatus for attaching a pipe to a structure.
Figure 45:
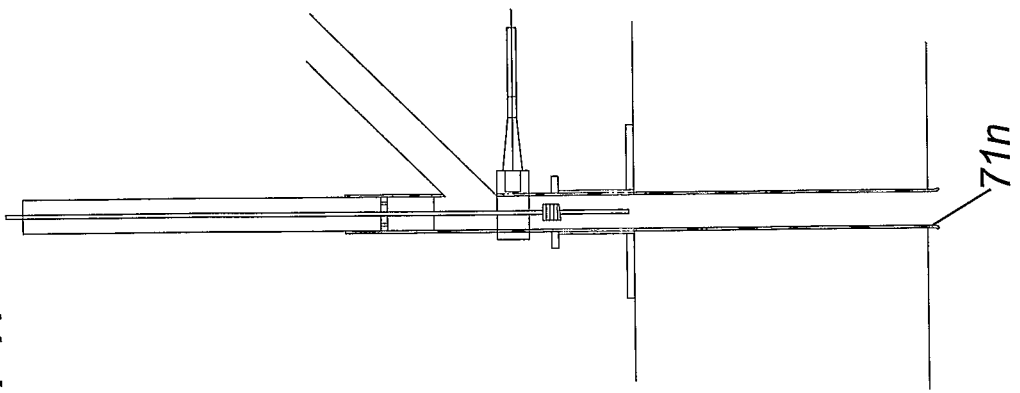

Referring now to FIGS. 34-48, a seventh embodiment is particularly useful for attaching a conduit to a structure having two skins, an outer skin, such as an outer wall of a ship's hull S1, and an inner skin, such as an oil tank S2, which is spaced from the outer hull S1, and which contains the fluid (e.g. oil) to be recovered. Normally the space between the outer and inner hulls in such ships is around 1m, but it is not a constant factor. In the FIG. 34 view, the conduit comprises a cylindrical pipe 71 having an external flange 71f that is spaced from one distal end, and a guide plate 72 similar to earlier embodiments. The guide plate 72 having a guide tube 72t has annular seals on its inner surfaces at 72s, and is adapted to attach temporarily to the hull S1 via magnets or other connections as previously described.

The upper end of the guide plate 72 is open to accept the pipe 71 and connect it to the structure S1 and S2.

The pipe 71 is a tight fit within the bore of the guide tube 72t as before, and has a very slightly smaller diameter than the bore of the guide tube 72t, in which it is axially slidable as before. The pipe is sealed within the bore of the guide tube 72t by the seals at 72s.

The pipe 71 incorporates a valve housing V, typically attached to a lower section of the pipe 71 via the flange 71f. The upper end of the pipe 71 has a coaxial upper section 71u, which carries a hydraulic cylinder 73 with a piston 73p to which is connected a rotary motor 74 that rotates a drill stem 75. A Y-piece 71y (not shown for clarity in FIGS. 42-45, but shown in FIGS. 46 and 47) branches at an angle from the upper section 71u and serves in use as a conduit to recover the fluids when the pipe 71 is attached to the structure S1/S2. The cylinder 73 and the drill stem 75 extend through the bore of the pipe 71 and the guide tube 72t, and the drill stem 75 is connected at its lower end to a rotary drill bit 76 that is suitable for cutting a circular hole through the structure S. The upper portion 71u of the pipe 71 above the Y-piece houses the drilling mechanism. The bit 76 fits within and is adapted to pass through the aperture of the guide plate 72, but has a larger diameter than the outer diameter of the pipe 71, so that the pipe 71 is able to pass through the hole cut by the bit 76, preferably with a close fit between them. The drill stem 75 connects to the drill bit 76 via a drift 77, which is similar to the drifts 7 described earlier.

The cylinder 73 is supported on the guide plate 72 by a frame 81 comprising a pair of parallel rods 82, which are connected together by a bridge 83 at their upper ends, optionally by means of releasable connectors between the rods 82 and the bridge 83. The rods are optionally connected at their opposite ends to releasable connectors (not shown) on the guide plate 72 that allow releasable interconnections between the rods 82 and the plate 72. In some embodiments the rods 82 can be welded to the plate 72. The frame 81 stabilises the cylinder 73 and secures it to the guide plate 72 and/or to the hull S1 during drilling of the holes.

Optionally the lower end of the pipe 71 has an annular groove (see FIG. 48) on its outer surface housing a spring clip 86 (or circlip or spring wedges) which is energised outwards, and can be held in compression in the annular groove so as to be flush with the outer surface of the pipe 71.

During assembly, the hydraulic cylinder 73 with the attached motor 74, drill stem 75 and drift 77 are connected together, and the top of the cylinder 73 is attached to the bridge 83, and the cylinder 73 with all of the attachments is then offered to the top of the inner bore of the upper pipe section 71u, so that the drift 77 passes down through the inner bore of the pipe 71 and the rods 82 pass down the outside of the pipe 71.

The spring clip 86 on the outer surface of the pipe 71 is radially compressed before the pipe 71 is offered to the bore of the guide tube 72t, and the spring clip 86 is then held in compression in the annular groove by the inner surface of the guide tube 72t, for as long as it remains within the bore of the guide tube 72t.

The rods 82 connect or are welded to the upper surface of the guide plate 72. Before the unit is deployed, the drill bit 76, which has the same diameter as the pipe 71, and which cannot therefore be received within its bore, is offered to the lower end of the aperture in the guide plate 72, before the guide plate is attached to the surface, and is attached to the drill stem 75 below the drift 77 (or in some variants, it can be attached to a shaft supported on bearings in the drift assembly). Once the drill bit 76 is attached to the drift 77 or the drill stem 75, the unit can be deployed, and the guide plate 72 temporarily attached to the outer hull S1, for example by means of magnets as previously described. At this stage, the assembly is now in the configuration shown in FIG. 42, with the drill bit 76 disposed within the guide tube 72t, between the lower end of the pipe 71, and the outer surface of the hull S1. The drill bit 76 can be retained on the end of the expander in a releasable manner, as previously described for earlier embodiments.

The rods 82 form part of a locking mechanism, to stabilise the hydraulic cylinder 73 on the guide plate 72, and to secure it there during swaging of at least the inner hull S2. As best shown in FIG. 39, the rods 82 pass through axial bores acting as pivot points on lever arms 84, which are connected together at their opposite ends by a small hydraulic cylinder 85, the extension of which can pivot the arms 84 around the rods 82. The lever arms 84 are pivotally restrained on the rods and are held captive against axial movement relative to the conduit typically by means of U-shaped brackets (not shown) connected to the flange 71f of the conduit. Thus the arms 84 can move pivotally around the rods 82, relative to the flange 71f, but cannot move axially relative to the flange 71f. They can, however, selectively move axially relative to the rods 82. The arms 84 have an unlocked configuration shown in FIG. 41, in which the small hydraulic cylinder 85 is extended, and the arms are pivoted outwards relative to one another around the rods 82, and a locked configuration shown in FIGS. 39 and 40, in which the small hydraulic cylinder 85 is retracted, and the free ends of the lever arms 84 move towards one another around the pivot points of the rods 82. This configuration change initiates a lock in the lever arms, which prevents them from sliding axially with respect to the rods 82. The mechanism for the locking of the arms is conventional and cams or captive ball bearings in the arms 82 running in wedge-shaped recesses will be sufficient.

The motor 74 is then actuated to drive the rotation of the drill stem 75 and the drill bit 76. Once the drill bit 76 is rotating at the required cutting speed, the piston 73p within the hydraulic cylinder 73 is extended to push the whole assembly of the pipe 71, the piston 73p, the motor 74, the drift 77 and the bit 76 together axially down through the guide tube 72t to cut through the outer hull S1. As the rods 82 are secured onto the guide plate and via that to the outer hull S1, the lever arms 84 freely slide down the rods 82 as long as the small hydraulic piston 85 is extended in the unlocked configuration shown in FIG. 41. Typically the drill bit 76 is retained on the drill stem 75, optionally by a reverse thread or a ball thread, which retains the bit 76 during normal clockwise rotation of the motor 74.

During penetration of the outer hull S1, the drift 77 is not moved axially through the pipe 71, but instead moves together with the whole assembly, so the pipe 71 is not swaged to the outer hull S1.

Once the bottom of the pipe 71 has passed through the guide tube 72t and the outer hull S1 into the void between the hulls S1 and S2, the apparatus is in the configuration shown in FIG. 43. At this point, the spring clip 86 is no longer held in compression in the groove by the inner surface of the guide tube 72t, and the spring clip 86 therefore expands radially outwards in the groove as shown in FIG. 48, to a diameter greater than the cutting diameter of the drill bit 76.

The cutting diameter of the drill bit 76 is chosen to closely match the external diameter of the pipe 71, so that the lower end of the pipe 71 is a close fit within the hole that is drilled through the structures S1, S2. However, the drift 77 is not driven axially within the pipe until after the penetration of the inner hull S2, so pipe 71 is free to move axially through the hole in the outer hull S1, towards the inner hull S2.

When the pipe 71 reaches the inner hull S1, the drill bit 76 starts to cut through the inner hull S1 and the pipe 71 moves axially as before through the inner hull S2 to the stage shown in FIG. 44, with the end of the pipe 71 with the neck 71n extending through the hole in the inner hull S2. The downward movement of the assembly and the pipe 71 towards the through the inner hull S2 continues until the radially energised spring clip 86 (which has a larger diameter than the hole that has been cut in the inner hull S2) bottoms out on the outer surface of the inner hull S2. At this point (shown in FIG. 44) the innermost end of the pipe 71 (and the neck 71n) extends below the inner end of the hole in the inner hull S2, and further axial movement of the pipe 71 within the guide tube 72t is prevented by the spring clip 86 abutting against the outer surface of the inner hull S2. At this point the small hydraulic cylinder 85 is retracted to axially lock the lever arms 84 onto the rods 82, thereby securing the hydraulic cylinder 73 immovably to the guide plate 72 and the pipe 71.

Figure 46:
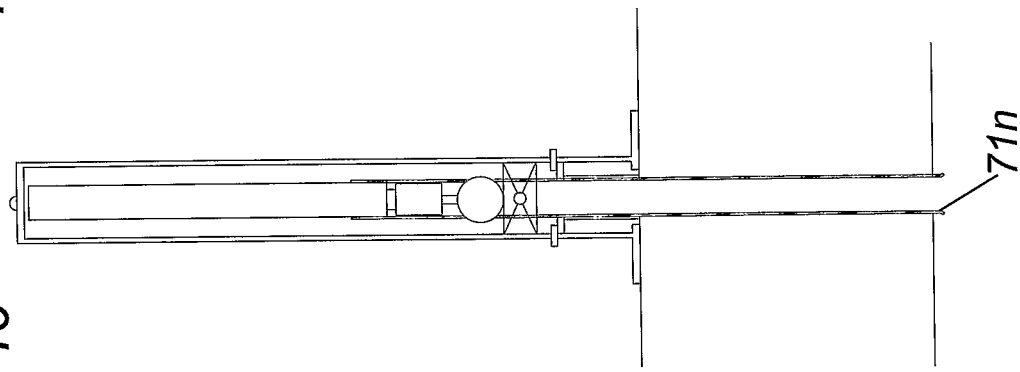
Figure 47:
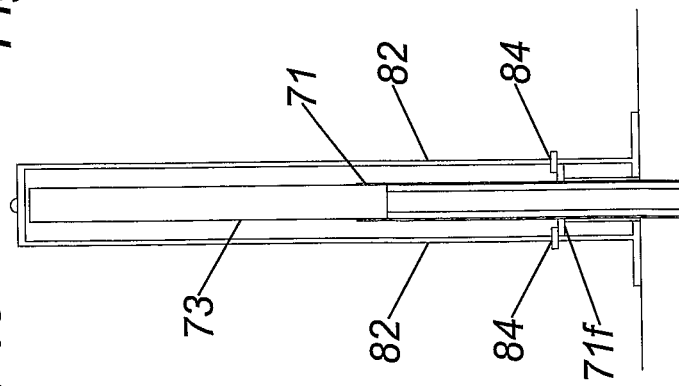
FIG. 47 shows a front view of the seventh embodiment corresponding to the side view configuration of FIG. 46.

Once the arms 84 are locked to the rods 82, the cylinder 73 is extended to push the drift 77 through the now stationary pipe 71. Because the cylinder 73 is now locked to the pipe, all the axial forces applied by extension of the cylinder are taken by the pipe 71, and this prevents the guide plate 72t from being forced off the outer hull S1 by a reaction force as the inner hull S1 is swaged. As the drift 77 moves axially down the pipe 71 it moves through the neck 1n, which is similar in design and function to the necks of the earlier pipes described above. The neck 71n comprises a lip that protrudes radially inwards around the inner circumference of the bore of the pipe 71, at the lowermost end of the pipe 71 that is protruding beyond the lower surface of the inner hull S2, so that the lip clears the lower surface of the inner hull S2. The lip typically comprises a continuous or discontinuous line of solder or weld, laid onto the inner surface of the pipe 71, adjacent its opening, or alternatively it can be formed by a counterbore of material cut from a single piece. The lip extends inwards by a predetermined distance that has an internal diameter that is wider than the external diameter of the head of the drift 77, but narrower than the apex. This permits the head to pass through the inwardly extending lip without deforming it, but since the apex of the drift 77 is wider than the internal diameter of the circumferential lip, it is eventually driven into engagement with the lip by the continued downward force exerted by the cylinder 73 relative to the now stationary pipe 71. At this point of engagement, the apparatus is substantially in the configuration shown in FIG. 45, with the widest part of the drift 77 at the apex pressing on the inner surface of the lip at the neck 71n of the pipe 71. The neck 71n of the pipe 71 is more malleable than the drift 77, and continued force applied from the cylinder 73 pushes the apex of the drift 77 down through the lip, causing it to deform radially outwards until the drift 77 passes entirely through the neck 71n of the pipe 71. After passage of the drift 77 through the neck 71n of the pipe 71, the outer diameter of the neck 71n of the pipe 71 is flared radially outwards, and is wider than the aperture in the inner hull S2, as shown in FIGS. 46, 47 and 48. The dimensions of the aperture, the pipe 71, and the apex of the drift 77 are chosen in close tolerance with one another, so that the passage of the drift 77 swages the outer diameter of the neck 71n of the pipe 71 securely to the inner hull S2.

The drill stem 75 is optionally releasably connected to the drill motor and drill bit as previously described, so that the drill bit 76 can optionally drop out of the lower end of the motor 74 and fall into the inner tank. At that point, the piston 73p can be retracted in the cylinder 73 as shown in FIG. 46, in order to remove the drill motor 74 from the lower bore of the pipe 71 below the Y piece 71y, the pipe 71 being now securely fastened to the inner hull S2 by means of the swage at the neck 71n. Typically the cylinder 73 retracts the motor above the level of the valve V, which is then closed.

Figure 49:
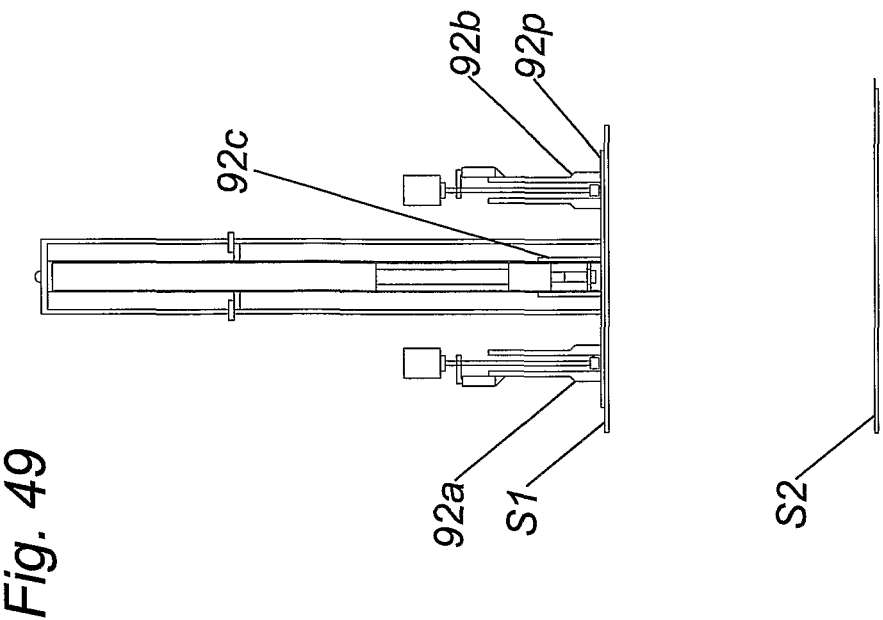
FIG. 49 shows a front sectional view of an eighth embodiment.

In some embodiments the guide plate can be held to the structure with magnets or other temporary attachment mechanisms and the forces on the hydraulic cylinder transmitted to the guide plate through the frame 81 and the locking devices on the lever arms 84, but in some cases, the locking devices can be omitted, and one or more small bore pipes can be swaged to the guide plate to secure and seal it to the structure before a further larger bore pipe is similarly swaged. Thus a single guide plate can have multiple pipes connected to it. FIG. 49 shows such an embodiment. In the FIG. 49 embodiment, the guide plate has at least three guide tubes 92a and 92b, both of which have small diameters (e.g. 2 inch) and 92c, which can be a large diameter tube. The small diameter guide tubes can be as described for the FIG. 30 embodiment, and can be used to attach the guide plate to the outer hull S1, while the guide plate is attached to the hull S1 via magnets (not shown) as described earlier. The two small bore tubes can seal the guide plate to the hull and prevent leaks through it, as well as providing an anchoring mechanism for the guide plate to the hull S1. Once the small bore tubes are attached to the guide plate and swaged to the hull S1, the void between the hulls S1 can be pumped out separately through the small bore pipes. Optionally one or both of the small bore pipes can be used to deliver heaters to the void to heat up and fluidise the contents, which can be very useful in the event that the void contains heavy oils. After the void has been emptied through the small bore pipes the large bore pipe in the larger guide tube 92c can be swaged to the inner hull S2 in the same way as described for the seventh embodiment. Optionally a number of such units can be attached at various locations along the outer hull S1, and the oil in the tank within the inner hull S2 can be heated by heaters inserted through certain pipes, and circulated between different pipes to maintain fluidity, before being extracted through one ore more different pipes.

Modifications and improvements can be incorporated without departing from the scope of the invention. For example, the seventh embodiment can be used with variants of the drive mechanism that pull the drift upwards through the neck rather than pushing it downwards as described herein. In some embodiments the rods can have a square cross section, and in others the cross section can be round. The drift can be supported on bearings on the drill stem, and typically does not rotate relative to the neck when it is expanding the neck. Collapsible drill bits can be used with any of the embodiments, which expand radially due to centrifugal force, and contract radially when stationary, and such bits can therefore have a resting diameter that can be accommodated within the pipe, thereby allowing deployment and recovery of the drill bit through the pipe without requiring the drill bit to drop into the tank after the cutting process.

The invention claimed is:

1. Apparatus for transfer of fluids to or from a structure, the apparatus comprising:
   a conduit having an outer surface and an internal passage with a deformable neck having an inner surface;
   a perforating mechanism comprising a drill stem cutting bit mounted on the end of the drill stem to form a hole in the structure configured to receive the deformable neck of the conduit;
   an expander device adapted to be received within the internal passage of the conduit, the expander device being axially moveable within the internal passage of the conduit, and having:
      an aperture configured to allow passage of the drill stem through the aperture of the expander device,
      an external surface with at least one portion that has a larger dimension than the inner surface of the neck of the internal passage; and
   a driving mechanism adapted to drive the expander device axially through the internal passage of the conduit, to axially drive the said at least one portion of the external surface of the expander device against the inner surface of the neck when the neck is located in the hole, and to expand the neck of the conduit, thereby deforming the neck radially outwardly and swaging the neck in the hole.

2. Apparatus as claimed in claim 1, having a stop mechanism comprising a protrusion that extends radially from the conduit perpendicular to the axis of the conduit.

3. Apparatus as claimed in claim 2, wherein the stop mechanism comprises a resilient ring that is biased radially outwards from a groove on the outer surface of the conduit.

4. Apparatus as claimed in claim 1, wherein the neck comprises a radially inwardly extending protrusion in the internal surface of the conduit.

5. Apparatus as claimed in claim 4, wherein the protrusion is within the bore of the internal passage and spaced from the end of the passage.

6. Apparatus as claimed in claim 4, in which the conduit is tubular, and the protrusion is a continuous annular ring around the inner circumference of the conduit.

7. Apparatus as claimed in claim 1, wherein the drive mechanism for the expander device drives the conduit axially through the hole in the structure.

8. Apparatus as claimed in claim 1, including an attachment mechanism to temporarily connect the conduit to the structure before the expander device is driven through the conduit.

9. Apparatus as claimed in claim 1, in which the perforating mechanism comprises a drill with a cutting bit that is advanced axially by a bit driving mechanism comprising a hydraulic cylinder and piston arrangement.

10. Apparatus as claimed in claim 9, wherein the hydraulic cylinder and piston arrangement drives the conduit into contact with the structure and drives the movement of the expander device through the neck.

11. Apparatus as claimed in claim 1, in which the expander device is tapered, with one portion that is wider than the neck, and one portion that is narrower than the neck.

12. Apparatus as claimed in claim 1, in which the expander device is itself adapted to change configuration between an expanded configuration and a retracted configuration.

13. Apparatus as claimed in claim 1, having a guide assembly, housing the conduit with the neck, and having a flange to facilitate temporary connection to the structure before the expander device is driven through the conduit.

14. Apparatus as claimed in claim 13, in which a single guide assembly can have multiple conduits connected thereto.

15. Apparatus as claimed in claim 1, in which the perforating device comprises a drill stem, and wherein the expander device is releasably connected to the drill stem and is adapted to disconnect therefrom upon passage of the expander device through the neck.

16. Apparatus as claimed in claim 1, in which the structure has a double skin, each with an outer and an inner surface, and the conduit is adapted to pass through the outer and inner skins of the structure before the neck is expanded, so that the neck is expanded when a portion of the neck is located in or beyond the inner skin of the structure.

17. Apparatus as claimed in claim 16, incorporating a resilient locking device located on the outer surface of the conduit, the resilient locking device being maintained in a first radially compressed configuration during passage of the locking device through the outer skin, and being adapted to change its configuration after passage through the outer skin to a radially expanded configuration that resists passage through the inner skin after the configuration change.

18. Apparatus as claimed in claim 1, in which the drive mechanism is secured to the structure.

19. Apparatus as claimed in claim 1, in which the drive mechanism has a supporting frame comprising elongate rods extending parallel to the conduit, and connected to the conduit through lever arms that engage and disengage the conduit.

20. Apparatus for transfer of fluids to or from a structure, the apparatus comprising:
a conduit having an internal passage with a deformable neck;
a perforating mechanism comprising a drill stem with a cutting bit at the end of the drill stem to form a hole in the structure to receive a portion of the conduit;
an expander device adapted to be received within the internal passage of the conduit, the expander device being axially moveable within the internal passage of the conduit, and having at least one portion that has a larger dimension than the neck of the internal passage; and
a driving mechanism adapted to drive the expander device through the internal passage of the conduit, to axially drive the said at least one portion of the external surface of the expander device against the inner surface of the neck when the neck is located in the hole, and to expand the neck of the conduit,
in which the expander device is apertured to allow passage of the drill stem through the expander device, and wherein the expander device incorporates bearings in the aperture to isolate torque applied to the expander device by the drill stem.

21. A method for attaching a conduit to a structure, the method comprising the steps of
providing a conduit with an internal passage having a deformable neck;
forming a hole through a face of the structure to enable passage of the neck through the hole;
passing the neck of the conduit through the hole in the structure;
providing a expander device adapted to be a restricted fit in the neck; and
driving the expander device axially through a portion of the conduit, whereby the expander device widens a portion of the internal passage of the conduit in the region of the neck, wherein the neck is deformed by the passage of the expander device from a first configuration in which it allows passage of the neck through the hole before the expander device is passed through the internal passage, to a second configuration, in which it restricts passage of the neck through the hole, after expansion of the neck by the movement of the expander device through the internal passage.

22. A method as claimed in claim 21, wherein the neck is passed through the hole and extends beyond the structure at the opposite end of the hole.

23. A method as claimed in claim 21, wherein a stop mechanism on the outer surface of the conduit limits the axial movement of the conduit into the hole.

24. A method as claimed in claim 21, in which the expander device is driven through the conduit past the neck until it drops from the distal end of the conduit.

25. A method as claimed in claim 21, in which the expander device is assembled below the neck at the distal end of the internal passage of the conduit, and the expander device is pulled through the conduit from the distal end to expand the neck.

26. A method as claimed in claim 21, in which the structure has a double skin, each with an outer and an inner surface, and the conduit is passed through the outer and inner skins of the structure before the neck is expanded, so that the neck is expanded when a portion of the neck is located in or beyond the inner skin of the structure.

* * * * *

UNITED STATES PATENT AND TRADEMARK OFFICE
CERTIFICATE OF CORRECTION

PATENT NO. : 8,528,186 B2  
APPLICATION NO. : 12/448928  
DATED : September 10, 2013  
INVENTOR(S) : Alexander Charles Crawford Page 1 of 1

It is certified that error appears in the above-identified patent and that said Letters Patent is hereby corrected as shown below:

In the Claims  
Claim 1, Col. 20, line 32, after "drill stem" insert --and a-- before "cutting bit".

Signed and Sealed this  
Tenth Day of December, 2013

Margaret A. Focarino  
*Commissioner for Patents of the United States Patent and Trademark Office*

UNITED STATES PATENT AND TRADEMARK OFFICE
CERTIFICATE OF CORRECTION

PATENT NO.       : 8,528,186 B2                             Page 1 of 1
APPLICATION NO.  : 12/448928
DATED            : September 10, 2013
INVENTOR(S)      : Alexander Charles Crawford It is certified that error appears in the above-identified patent and that said Letters Patent is hereby corrected as shown below:

On the title page, item [73] change the Assignee from "Deep Tek IP Limited" to
    --Deep Tek Underwater IP Limited--.

Signed and Sealed this
Eleventh Day of March, 2014

Michelle K. Lee
*Deputy Director of the United States Patent and Trademark Office*